(12) United States Patent
Sano et al.

(10) Patent No.: US 10,817,734 B2
(45) Date of Patent: Oct. 27, 2020

(54) INFORMATION PROCESSING APPARATUS, INFORMATION PROCESSING METHOD, AND COMPUTER PROGRAM PRODUCT

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Yuma Sano, Setagaya (JP); Tomoki Watanabe, Inagi (JP)

(73) Assignees: KABUSHIKI KAISHA TOSHIBA, Minato-ku (JP); TOSHIBA ELECTRONIC DEVICES & STORAGE CORPORATION, Minato-ku (JP)

(*) Notice: Subject to any disclaimer, the term of this patent is extended or adjusted under 35 U.S.C. 154(b) by 0 days.

(21) Appl. No.: 16/285,266

(22) Filed: Feb. 26, 2019

(65) Prior Publication Data
US 2019/0318176 A1    Oct. 17, 2019

(30) Foreign Application Priority Data
Apr. 13, 2018   (JP) .................................. 2018-077541

(51) Int. Cl.
*G06K 9/00*      (2006.01)
*B60R 1/00*      (2006.01)
(Continued)

(52) U.S. Cl.
CPC ............. *G06K 9/00805* (2013.01); *B60R 1/00* (2013.01); *G01S 17/89* (2013.01); *G06F 17/18* (2013.01);
(Continued)

(58) Field of Classification Search
CPC .. G05D 1/0274; B60R 1/00; B60R 2300/607; G06T 15/20; G06T 17/00; G06K 9/3241;
(Continued)

(56) References Cited

U.S. PATENT DOCUMENTS

2001/0018640 A1*   8/2001   Matsunaga .......... G05D 1/0246
                                                    701/301
2008/0189036 A1*   8/2008   Elgersma ............... G05D 1/101
                                                    382/153
(Continued)

FOREIGN PATENT DOCUMENTS

EP         1 956 457 A1    8/2008
JP         2017-215939     12/2017
(Continued)

OTHER PUBLICATIONS

Aotani, Y. et al., "Development of Autonomous Navigation System Using 3D Map with Geometric and Semantic Information", Journal of Robotics and Mechatronics, vol. 29, No. 4, 2017, pp. 639-648.
(Continued)

*Primary Examiner* — Zhihan Zhou
(74) *Attorney, Agent, or Firm* — Oblon, McClelland, Maier & Neustadt, L.L.P.

(57)    ABSTRACT

An information processing apparatus according to an embodiment includes one or more processors configured to: acquire an image and three-dimensional point information on a three-dimensional point of acquired surroundings of the image; assign an attribute to each region in the image; set, to the three-dimensional point, the attribute assigned to the corresponding region in the image; and generate an obstacle map based on the three-dimensional point information and the attribute that is set to the three-dimensional point.

14 Claims, 13 Drawing Sheets

(51) Int. Cl.
*G01S 17/89* (2020.01)
*G06F 17/18* (2006.01)
*G06K 9/32* (2006.01)

(52) U.S. Cl.
CPC ....... *G06K 9/00825* (2013.01); *G06K 9/3241* (2013.01); *B60R 2300/607* (2013.01)

(58) Field of Classification Search
CPC ........... G06K 9/00805; G06K 9/00664; G06K 9/00791; G06K 9/00825; G06F 17/18; G01S 17/89
See application file for complete search history.

(56) References Cited

U.S. PATENT DOCUMENTS

| | | |
|---|---|---|
| 2017/0344844 A1 | 11/2017 | Sano et al. |
| 2017/0344888 A1 | 11/2017 | Sano et al. |
| 2018/0189599 A1 | 7/2018 | Sano et al. |
| 2018/0189927 A1 | 7/2018 | Watanabe et al. |
| 2019/0050649 A1 | 2/2019 | Watanabe et al. |
| 2019/0052842 A1* | 2/2019 | Du .......................... H04W 4/80 |

FOREIGN PATENT DOCUMENTS

| | | |
|---|---|---|
| JP | 2017-215940 | 12/2017 |
| JP | 2018-109564 | 7/2018 |
| JP | 2018-109881 | 7/2018 |
| JP | 2019-32700 A | 2/2019 |

OTHER PUBLICATIONS

Wada, K. et al., "3D Object Segmentation for Shelf Bin Picking by Humanoid with Deep Learning and Occupancy Voxel Grid Map", 2016 IEEE-RAS 6$^{th}$ International Conference on Humanoid Robots (Humanoids). 2016, pp. 1149-1154.

Thorpe, C. et al., "Vision and Navigation for the Carnegie-Mellon Navlab", IEEE Transactions on Pattern Analysis and Machine Intelligence, XP000006852, vol. 10, No. 3, May 3, 1988, pp. 362-373.

Yang, S., et al., "Semantic 3D Occupancy Mapping through Efficient High Order CRFs", IROS 2017, 8 pages.

Long, J., et.al, "Fully Convolutional Networks for Semantic Segmentation", CVPR 2015, 10 pages.

Badrinarayanan, V., et. al., "SegNet: A Deep Convolutional Encoder-Decoder Architecture for Robust Semantic Pixel-Wise Labelling", CVPR 2015, 10 pages.

Kundu, A., et al., "Joint Semantic Segmentation and 3D Reconstruction from Monocular Video", ECCV 2014, 16 pages.

* cited by examiner

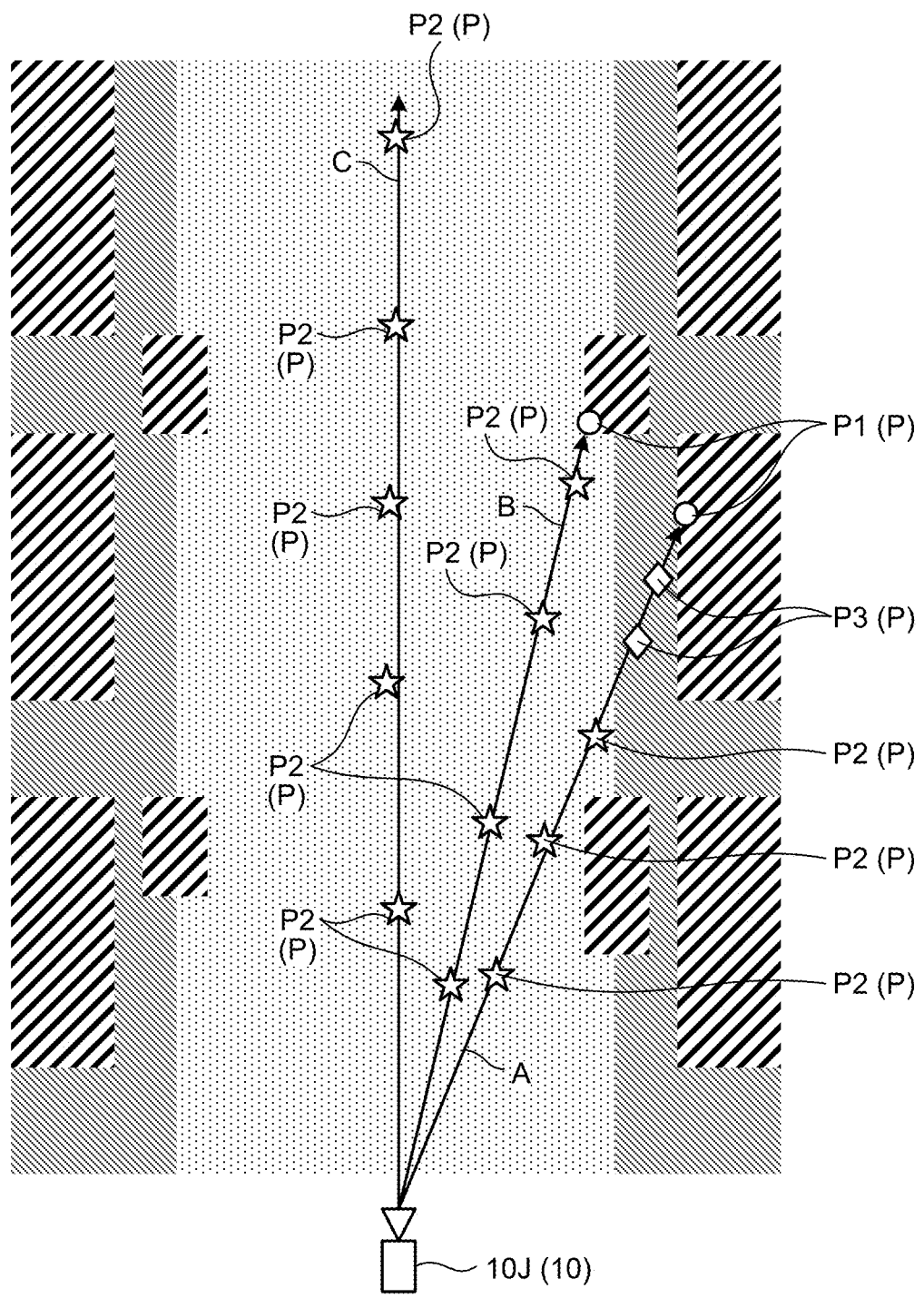

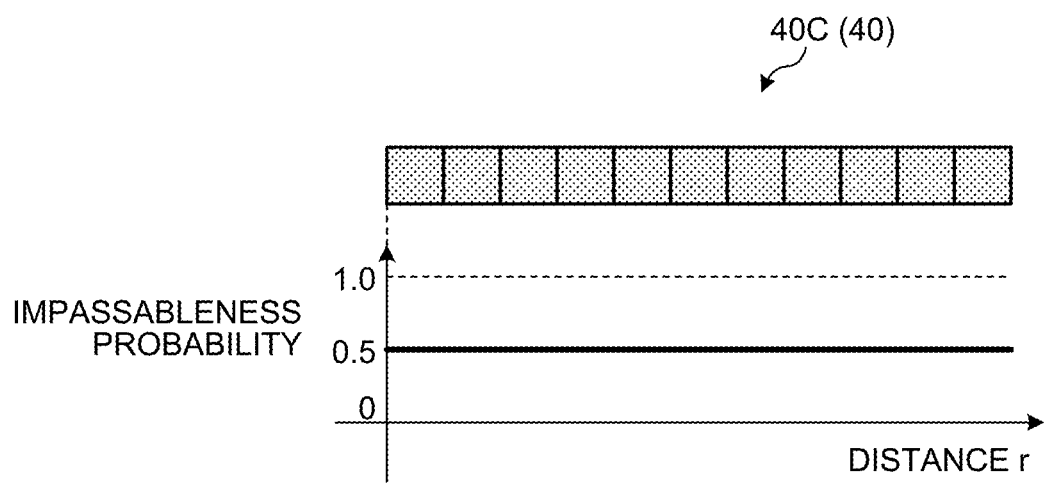

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-077541, filed on Apr. 13, 2018, the entire contents of which are incorporated herein by reference.

FIELD

Embodiments described herein relate generally to an information processing apparatus, an information processing method, and a computer program product.

BACKGROUND

There has been known a technology for generating an obstacle map regarding obstacles to traveling with a mobile body. There has been also known a technology that generates an obstacle map that specifies, in addition to impassable regions in three-dimensional shapes in real space, the regions that are impassable in travel rules even though the regions may be passable in three-dimensional shapes. For example, there has been known a technology of identifying an attribute and updating the attribute for each frame on each voxel constituting a three-dimensional grid map generated from the stereo parallax.

However, in the conventional technology, because the identification of the attribute and the update of the attribute are performed on each voxel of the three-dimensional grid map for each frame, a processing load in generating the obstacle map may increase.

BRIEF DESCRIPTION OF THE DRAWINGS

FIG. 7 is a top view of the attribute image;
FIG. 9 is a schematic diagram illustrating the impassableness probabilities.

DETAILED DESCRIPTION

An information processing apparatus according to an embodiment includes one or more processors configured to: acquire an image and three-dimensional point information on a three-dimensional point of acquired surroundings of the image; assign an attribute to each region in the image; set, to the three-dimensional point, the attribute assigned to the corresponding region in the image; and generate an obstacle map based on the three-dimensional point information and the attribute that is set to the three-dimensional point.

With reference to the accompanying drawings, an information processing apparatus, an information processing method, and a computer program product will be described in detail.

Figure 1:
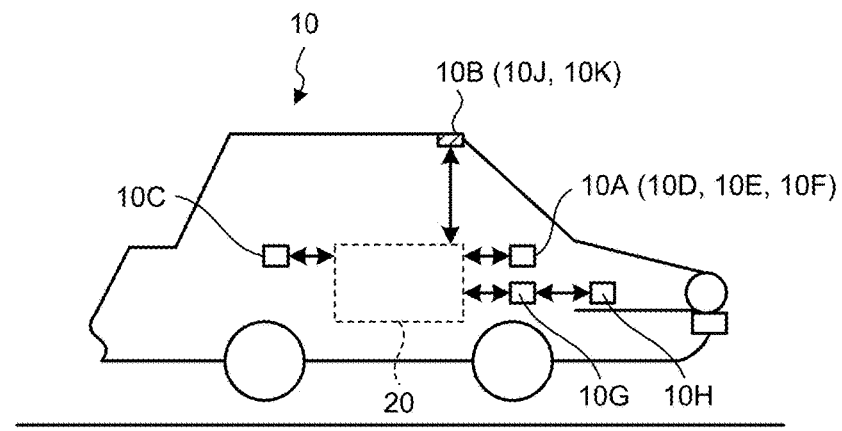
FIG. 1 is a diagram illustrating a configuration of a mobile body.

FIG. 1 is a diagram illustrating one example of a mobile body 10 according to an embodiment.

The mobile body 10 includes an information processing apparatus 20, an output unit 10A, an outside sensor 10B, an inner sensor 10C, a power controller 10G, and a power unit 10H.

The information processing apparatus 20 is a dedicated or general-purpose computer, for example. In the present embodiment, the case where the information processing apparatus 20 is installed on the mobile body 10 will be described as one example.

The mobile body 10 is an object that is movable. Examples of the mobile body 10 include a vehicle, a dolly, a flying object (a manned aircraft, an unmanned aircraft (for example, an unmanned aerial vehicle (UAV) and a drone)), a robot, or the like. Examples of the mobile body 10 include a mobile body that travels via drive operation by a human and a mobile body that is capable of autonomously traveling (autonomous travel) without going through the drive operation by a human. In the present embodiment, the case where the mobile body 12 is a vehicle will be described as one example. Examples of the vehicle include a two-wheeled vehicle, a three-wheeled vehicle, a four-wheeled vehicle, and the like. In the present embodiment, the case where the vehicle is a four-wheeled vehicle capable of autonomous travel will be described as one example.

The information processing apparatus 20 is not limited to the form of being installed on the mobile body 10. The information processing apparatus 20 may be installed on a stationary object. The stationary object is an object fixed to the ground. The stationary object is an object that is immovable and an object that is in a state of standing still with respect to the ground. Examples of the stationary object include a traffic signal, a parked vehicle, a road sign, or the like. In addition, the information processing apparatus 20 may be installed on a cloud server that executes processing on a cloud.

The power unit 10H is a drive device installed on the mobile body 10. Examples of the power unit 10H include an engine, a motor, a wheel, or the like.

The power controller 10G controls the power unit 10H. By the control of the power controller 10G, the power unit 10H drives. For example, the power controller 10G controls the power unit 10H in order to autonomously drive the mobile body 10 on the basis of information obtained from the outside sensor 10B and the inner sensor 10C, and an obstacle map generated by processing which will be described later. By the control of the power unit 10H, controlled are an acceleration amount of the mobile body 10, a brake amount, a steering angle, and the like. For example, the power controller 10G controls the vehicle so as to maintain the lane currently traveling while avoiding an object such as an obstacle and to maintain an inter-vehicular distance of a certain distance or more with a vehicle ahead.

The output unit 10A outputs various information. In the present embodiment, the output unit 10A outputs information indicating an obstacle map generated by the information processing apparatus 20. The detail of the obstacle map will be described later.

The output unit 10A includes, for example, a communication function of transmitting the information indicating the obstacle map, a display function of displaying the obstacle map, a sound output function of outputting sound indicating the obstacle map, and the like. For example, the output unit 10A includes at least one of a communicator 10D, a display 10E, and a speaker 10F. In the present embodiment, the configuration in which the output unit 10A includes the communicator 10D, the display 10E, and the speaker 10F will be described as one example.

The communicator 10D transmits the information indicating the obstacle map to other devices. For example, the communicator 10D transmits the information indicating the obstacle map to the other devices via a known communications line. The display 10E displays the information indicating the obstacle map. Examples of the display 10E include a known organic electroluminescent (EL) display, a liquid crystal display (LCD), a projector, a light, or the like. The speaker 10F outputs the sound indicating the obstacle map.

The outside sensor 10B is a sensor that recognizes the outside around the periphery of the mobile body 10. The outside sensor 10B may be installed on the mobile body 10 or may be installed on the outside of the mobile body 10. Examples of the outside of the mobile body 10 include another mobile body, an external device, or the like.

The periphery of the mobile body 10 is a region within a range predetermined from the mobile body 10. This range is a range in which the outside sensor 10B can observe. The range only needs to be set up in advance.

The outside sensor 10B acquires observation information on the outside. The observation information is the information indicating an observation result of the periphery of the position where the outside sensor 10B is placed. In the present embodiment, the observation information is the information from which an image and three-dimensional point information can be derived. The observation information may be the information indicating the image and the three-dimensional point information.

In the present embodiment, the outside sensor 10B includes a photographing unit 10J. In the present embodiment, the photographing unit 10J acquires a captured image as the image. The image included in the observation information is not limited to the captured image. The captured image may be a three-dimensional image or may be a two-dimensional image. In the present embodiment, the case where the image included in the observation information is a two-dimensional captured image will be described as one example.

The photographing unit 10J obtains a captured image that photographed the periphery of the mobile body 10. The photographing unit 10J is a known digital camera, for example. Photographing designates converting an image of a subject that is formed by an optical system such as a lens into an electric signal. The photographing unit 10J outputs the photographed captured image to the information processing apparatus 20.

In the present embodiment, the outside sensor 10B further includes a measurer 10K. The measurer 10K measures three-dimensional point information on a three-dimensional point of acquired surroundings of the captured image.

The three-dimensional point represents each point that is individually observed by the measurer 10K in the acquired surroundings of the captured image, that is, the photographed surroundings. For example, the measurer 10K emits light to the periphery of the measurer 10K and receives reflected light reflected at a reflecting point. This reflecting point is equivalent to the three-dimensional point. A plurality of reflecting points may be used as one three-dimensional point.

The three-dimensional point information is the information indicating a three-dimensional position in real space (three-dimensional space). The three-dimensional point information may be information indicative of the distance from the measurer 10K to the three-dimensional point and of the direction of the three-dimensional point with reference to the measurer 10K. The distance and the direction can be represented by position coordinates indicating a relative position of the three-dimensional point with reference to the measurer 10K, position coordinates indicating an absolute position of the three-dimensional point, a vector, or the like, for example. Specifically, the three-dimensional point information is represented in polar coordinates and orthogonal coordinates.

Examples of the measurer 10K include a stereo camera, a single-lens camera, a distance sensor (a millimeter-wave radar and a laser sensor), a sonar sensor that detects an object by sound waves, an ultra-sonic sensor, or the like. Examples of the laser sensor include a two-dimensional laser imaging detection and ranging (LIDAR) sensor placed in parallel with the horizontal plane, and a three-dimensional LIDAR sensor.

When the measurer 10K is a stereo camera, the measurer 10K only needs to measure, by using parallax information between the cameras, the three-dimensional point information on the three-dimensional point. When the measurer 10K is a single-lens camera, the measurer 10K may measure, based on the changes in the captured image along with the movement of the mobile body 10 identified by using structure-from-motion or the like, the three-dimensional point information on the three-dimensional point.

When the measurer 10K is a laser sensor, the measurer 10K obtains the observation information that includes the irradiation direction of the laser, and the information on the reflected light of the laser at the three-dimensional point. Examples of the information on the reflected light include the elapsed time from the irradiation of the laser to the reception of the reflected light, the intensity of the received reflected light, an attenuation rate of the intensity of the received reflected light to the intensity of the emitted laser, or the like. In this case, the measurer 10K only needs to measure the three-dimensional point information, by deriving the three-dimensional point information on the three-dimensional point by using the observation information and a known calculation measurement method.

The measurer 10K then outputs the three-dimensional point information on the measured three-dimensional point to the information processing apparatus 20. The information processing apparatus 20 may derive the three-dimensional point information on each three-dimensional point from the observation information. In the present embodiment, the case where the measurer 10K derives the three-dimensional point information on each three-dimensional point will be described as one example.

In the present embodiment, the case where the photographing unit 10J is placed in a travel direction of the mobile body 10 as a photographing direction will be described as one example. Furthermore, the case where the measurer 10K is placed in the travel direction of the mobile body 10 as a measuring direction will be described as one example.

Because of this, in the present embodiment, the case where the photographing unit 10J and the measurer 10K acquire, in the travel direction (that is, the front) of the mobile body 10, the captured image and the three-dimensional point information on each three-dimensional point will be described as one example.

The inner sensor 10C is a sensor that observes the information on the mobile body 10 itself. The inner sensor 10C acquires self-location information indicating the position of the mobile body 10. As in the foregoing, in the present embodiment, the mobile body 10 is equipped with the photographing unit 10J and the measurer 10K. Accordingly, it is possible to say that the self-location information is the information indicating the position of the mobile body 10 and also the positions of the photographing unit 10J and the measurer 10K.

Examples of the inner sensor 10C include an inertial measurement unit (IMU), a velocity sensor, a global positioning system (GPS), or the like. The IMU obtains triaxial acceleration, triaxial angular velocity, and the like of the mobile body 10. The self-location information is assumed to be represented in world coordinates.

Figure 2:
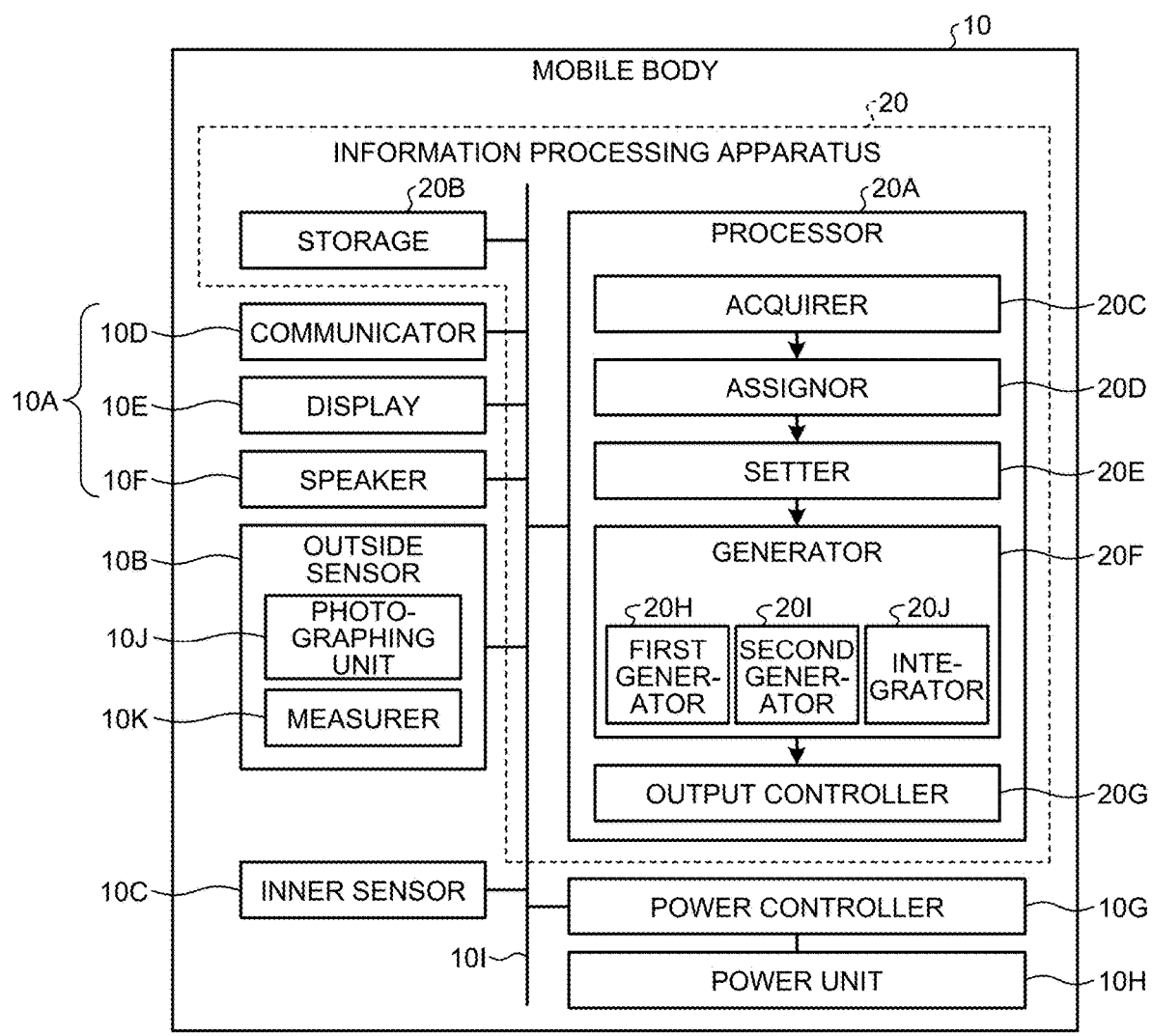
FIG. 2 is a block diagram of the mobile body.

Next, an electrical configuration of the mobile body 10 will be described in detail. FIG. 2 is a block diagram illustrating one example of the configuration of the mobile body 10.

The mobile body 10 includes the information processing apparatus 20, the output unit 10A, the outside sensor 10B, the inner sensor 10C, the power controller 10G, and the power unit 10H. As in the foregoing, the output unit 10A includes the communicator 10D, the display 10E, and the speaker 10F.

The information processing apparatus 20, the output unit 10A, the outside sensor 10B, the inner sensor 10C, and the power controller 10G are connected via a bus 101. The power unit 10H is connected to the power controller 10G.

The information processing apparatus 20 includes a storage 20B and a processor 20A. That is, the output unit 10A, the outside sensor 10B, the inner sensor 10C, the power controller 10G, the processor 20A, and the storage 20B are connected via the bus 10I.

At least one of the storage 20B, the output unit 10A (the communicator 10D, the display 10E, and the speaker 10F), the outside sensor 10B, the inner sensor 10C, and the power controller 10G only needs to be connected to the processor 20A via wiring or in a wireless manner. Furthermore, at least one of the storage 20B, the output unit 10A (the communicator 10D, the display 10E, and the speaker 10F), the outside sensor 10B, the inner sensor 10C, and the power controller 10G may be connected to the processor 20A via a network.

The storage 20B stores therein various data. Examples of the storage 20B include a semiconductor memory device such as a random access memory (RAM) and a flash memory, a hard disk, an optical disc, and the like. The storage 20B may be a storage device provided externally to the information processing apparatus 20. The storage 20B may be a storage medium. Specifically, the storage medium may be a medium storing therein or temporarily storing therein programs and various information by downloading via a local area network (LAN), the Internet, and the like. The storage 20B may be composed of a plurality of storage media.

The processor 20A includes an acquirer 20C, an assignor 20D, a setter 20E, a generator 20F, and an output controller 20G. The generator 20F includes a first generator 20H, a second generator 20I, and an integrator 20J.

The processor 20A, the storage 20B, the acquirer 20C, the assignor 20D, the setter 20E, the generator 20F, the output controller 20G, the first generator 20H, the second generator 20I, and the integrator 20J are implemented by one or more processors, for example. For example, the above-described various units are implemented by one or more processors. For example, the above-described various units may be implemented by making the processor such as a central processing unit (CPU) execute a program, that is, by software. The above-described various units may be implemented by a processor such as a dedicated integrated circuit (IC), that is, by hardware. The above-described various units may be implemented by using the software and the hardware in combination. When a plurality of processors are used, each processor may implement one out of the various units or may implement two or more out of the various units.

The processor implements the above-described various units by reading out and executing the program stored in the storage 20B. In place of storing the program in the storage 20B, it may be configured such that the program is directly incorporated in the circuitry of the processor. In this case, the processor implements the above-described various units by reading out and executing the program incorporated in the circuitry.

The acquirer 20C acquires the captured image, and the three-dimensional point information on the three-dimensional point of the acquired surroundings (photographed surroundings) of the captured image.

In the present embodiment, the acquirer 20C acquires the captured image from the photographing unit 10J. The acquirer 20C further acquires the three-dimensional point information on each of a plurality of three-dimensional points from the measurer 10K.

In the present embodiment, the acquirer 20C acquires, each time photographing is performed by the photographing unit 10J, a set of the captured image obtained by photographing, the self-location information indicating the position of the mobile body 10 at the time of photographing, and the three-dimensional point information on each of the three-dimensional points of the photographed surroundings of a captured image 30. That is, the acquirer 20C acquires a plurality of relevant sets in time series.

Figure 3:
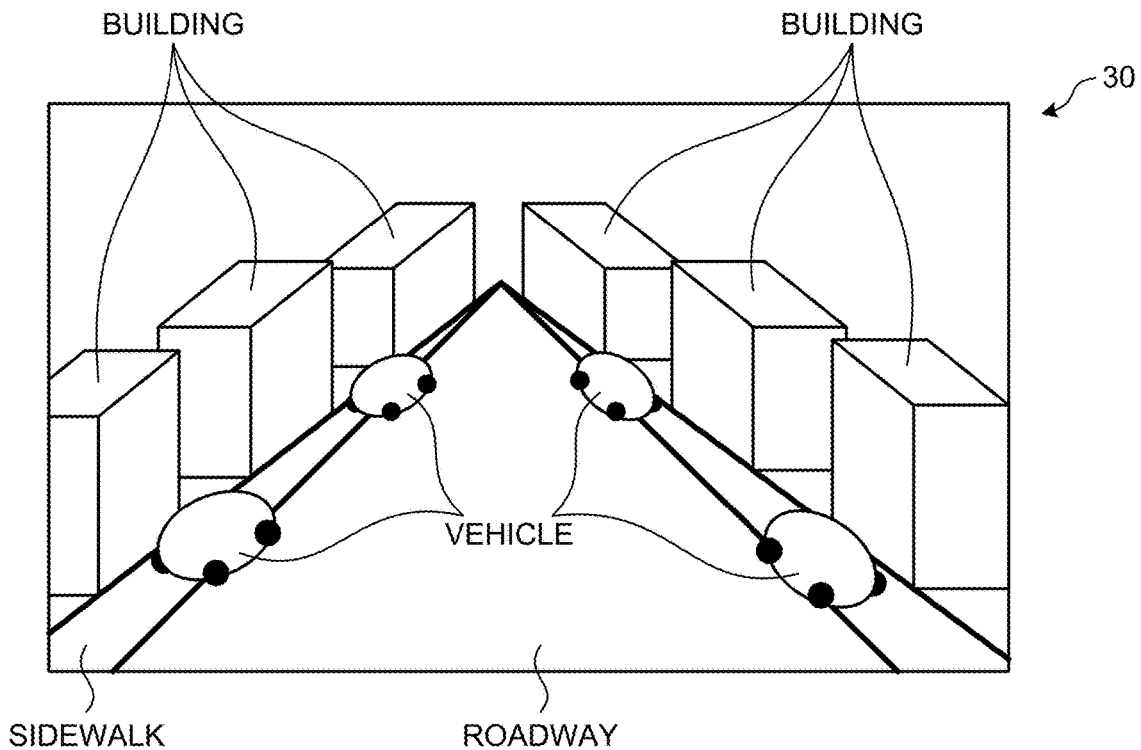
FIG. 3 is a schematic diagram of a captured image.

FIG. 3 is a diagram illustrating one example of the captured image 30. The captured image 30 illustrated in FIG. 3 is a captured image obtained by photographing the front of the mobile body 10. In the captured image 30, photographed are a roadway, sidewalks on the sides of the roadway, parked vehicles (other vehicles), and buildings. In the present embodiment, by photographing by the photographing unit 10J fitted to the mobile body 10, the acquirer 20C acquires in time series a captured image that photographed the range concerning the travel of the mobile body 10 like the image illustrated in FIG. 3.

Referring back to FIG. 1, the description is continued. The assignor 20D assigns an attribute to each region in the captured image 30. In more detail, the assignor 20D determines the attribute for each of a plurality of regions obtained by dividing the captured image 30. Examples of the region in the captured image 30 include a pixel region of each pixel constituting the captured image 30, a pixel region composed of a plurality of adjacent pixel groups, and the like. The assignor 20D then assigns the determined attribute to each of those regions.

The attribute indicates the characteristics and nature of each group for which the surroundings of the periphery of the mobile body 10 is categorized to a plurality of groups in accordance with a predetermined condition. In the present embodiment, the attribute indicates being passable, being impassable, or a solid object.

The assignor 20D determines the attribute for each region in the captured image 30 by using a known method. For example, the assignor 20D determines the attribute by using machine learning. For the attribute determination using machine learning, a known method only needs to be used. For example, the assignor 20D determines the attribute for each region in the captured image 30 by using the method of J. Long, et. al, "Fully Convolutional Networks for Semantic Segmentation", CVPR 2015; V. Badrinarayanan, et. al, "SegNet: A Deep Convolutional Encoder-Decoder Architecture for Robust Semantic Pixel-Wise Labelling", CVPR 2015; or the like.

In this way, the assignor 20D assigns, to each region in the captured image 30, the attribute of the relevant region. For example, when the region represents the pixel region of one pixel, the assignor 20D determines the attribute for each pixel. Then, the assignor 20D assigns, to each region (pixel region) in the captured image 30, the attribute by specifying the attribute determined for each pixel as a pixel value of the pixel.

Figure 4:
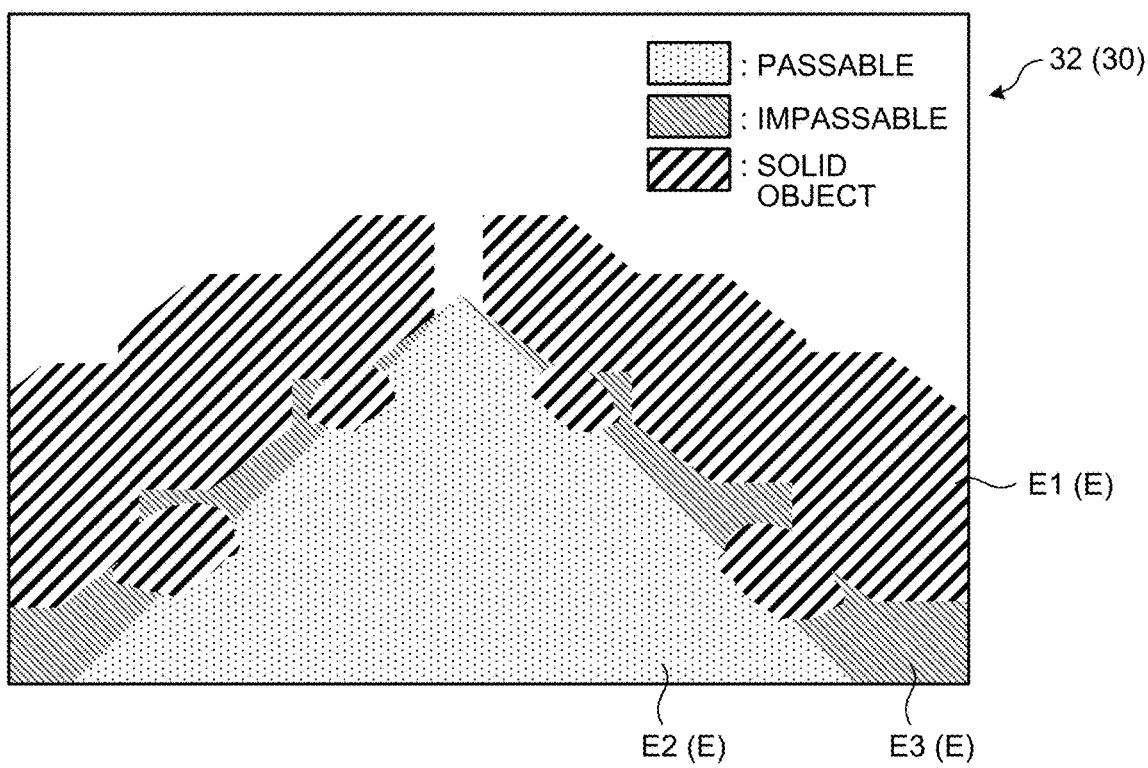
FIG. 4 is a schematic diagram of an attribute image.

FIG. 4 is a schematic diagram illustrating one example of an attribute image 32 for which the attribute is assigned to each region E in the captured image 30. The assignor 20D generates the attribute image 32 illustrated in FIG. 4, by assigning the attribute to each region E in the captured image 30, for example.

In the present embodiment, the assignor 20D assigns, on the captured image 30, the attributes (passable and impassable) different from each other to the roadway that is a passable region E2 and to the sidewalks that are impassable regions E3. Although the sidewalk is a region that the mobile body 10 is able to pass through, it is the region where passing is prohibited by traffic rules. For such a region E3, the assignor 20D assigns the attribute indicative of being impassable. The assignor 20D further assigns the attribute indicating a solid object to a region E1 indicating other vehicles and buildings included in the captured image 30.

The assignor 20D then outputs to the setter 20E the attribute image 32 for which the attribute has been assigned to each region E in the captured image 30.

Referring back to FIG. 2, the description is continued. Next, the setter 20E will be described. The setter 20E sets, to the three-dimensional point, the attribute assigned to the corresponding region E in the captured image 30.

The setter 20E identifies the correspondence between the three-dimensional point and the pixel of the captured image 30. That is, the setter 20E identifies, on each three-dimensional point indicated by the three-dimensional point information acquired by the acquirer 20C, the pixel of the corresponding position out of the pixels constituting the captured image 30. Then, the setter 20E sets, to the three-dimensional point, the attribute assigned to the region E including the pixel of the identified corresponding position.

In more detail, the setter 20E converts, for each three-dimensional point, the coordinates of the three-dimensional position indicated in the three-dimensional point information into the coordinates (camera coordinates) with the position of the photographing unit 10J, where the captured image 30 was photographed, as the origin. That is, the three-dimensional position indicated in the three-dimensional point information is the three-dimensional coordinates with the measurer 10K as the origin. Accordingly, the setter 20E performs coordinate transformation on the three-dimensional coordinates indicated by the three-dimensional point information acquired from the measurer 10K, and converts it into the camera coordinates with the photographing unit 10J as the origin.

Specifically, a rotation matrix to the camera coordinates with the photographing unit 10J at the time of photographing the captured image 30 as the origin from the coordinates of a three-dimensional position indicated by the three-dimensional point information is assumed to be $R_C$. A translation vector is assumed to be $t_C$. Then, the camera coordinates $(X_C, Y_C, Z_C)$ with the position of the photographing unit 10J at the time of photographing the captured image 30 as the origin with respect to the coordinates $(X_{in}, Y_{in}, Z_{in})$ of the three-dimensional point indicated by the three-dimensional point information is expressed by the following Expression (1).

$$\begin{pmatrix} X_C \\ Y_C \\ Z_C \end{pmatrix} = R_C \begin{pmatrix} X_{in} \\ Y_{in} \\ Z_{in} \end{pmatrix} + t_C \quad (1)$$

The rotation matrix $R_C$ is a matrix of 3×3, and the translation vector $t_C$ is a vector of three elements.

The setter 20E then converts the coordinates of the three-dimensional position indicated by the three-dimensional point information on the three-dimensional point into the camera coordinates by using the above-described Expression (1).

As in the foregoing, the attribute image 32 is the image for which the attributes have been assigned to the regions E (for example, pixel region) in the captured image (see FIG. 4). Thus, the setter 20E then calculates, on the three-dimensional point indicated by the coordinates $(M=(X_C, Y_C, Z_C))$ of the three-dimensional position after the coordinate transformation, the coordinates $(m=(x_C, y_C))$ of the pixel of the corresponding position in the attribute image 32 by using the following Expression (2).

$$m' = A_C \cdot M' \quad (2)$$

In Expression (2), m' represents the homogeneous coordinates of the coordinates $m=(x_C, y_C)$. M' represents the homogeneous coordinates of the coordinates $M=(X_C, Y_C, Z_C)$. $A_C$ represents internal parameters of the photographing unit 10J.

The internal parameters of the photographing unit 10J represent the characteristics of the photographing unit 10J. Examples of the internal parameters of the photographing unit 10J include a focal length of lens of the photographing unit 10J, the position or the position coordinates of the image center of the element with respect to the optical axis of the lens, and the like.

There may be the case where a photographing device is a stereo camera and the like and the measurer 10K measures the three-dimensional point information on the three-dimensional point on the basis of a stereo image obtained by photographing. In this case, in the process of measuring the three-dimensional point information by the measurer 10K, the coordinates $(x_C, y_C)$ in the captured image 30 corresponding to the three-dimensional coordinates $(X_C, Y_C, Z_C)$ is known. Thus, in this case, the calculation of Expression (1) is unnecessary.

It is assumed that the internal parameters $A_C$ of the photographing unit 10J, the rotation matrix $R_C$ that is an external parameter, and the translation vector $t_C$ have been acquired in advance by prior calibration.

The setter 20E then sets, to each three-dimensional point, the attribute calculated from the coordinates $(M=(X_C, Y_C, Z_C))$ after the coordinate translation and assigned to the region E of the corresponding coordinates $(m=(x_C, y_C))$ in the attribute image 32. By this processing, the setter 20E sets, to the three-dimensional point, the attribute assigned to the corresponding region E in the captured image 30.

Figure 5:
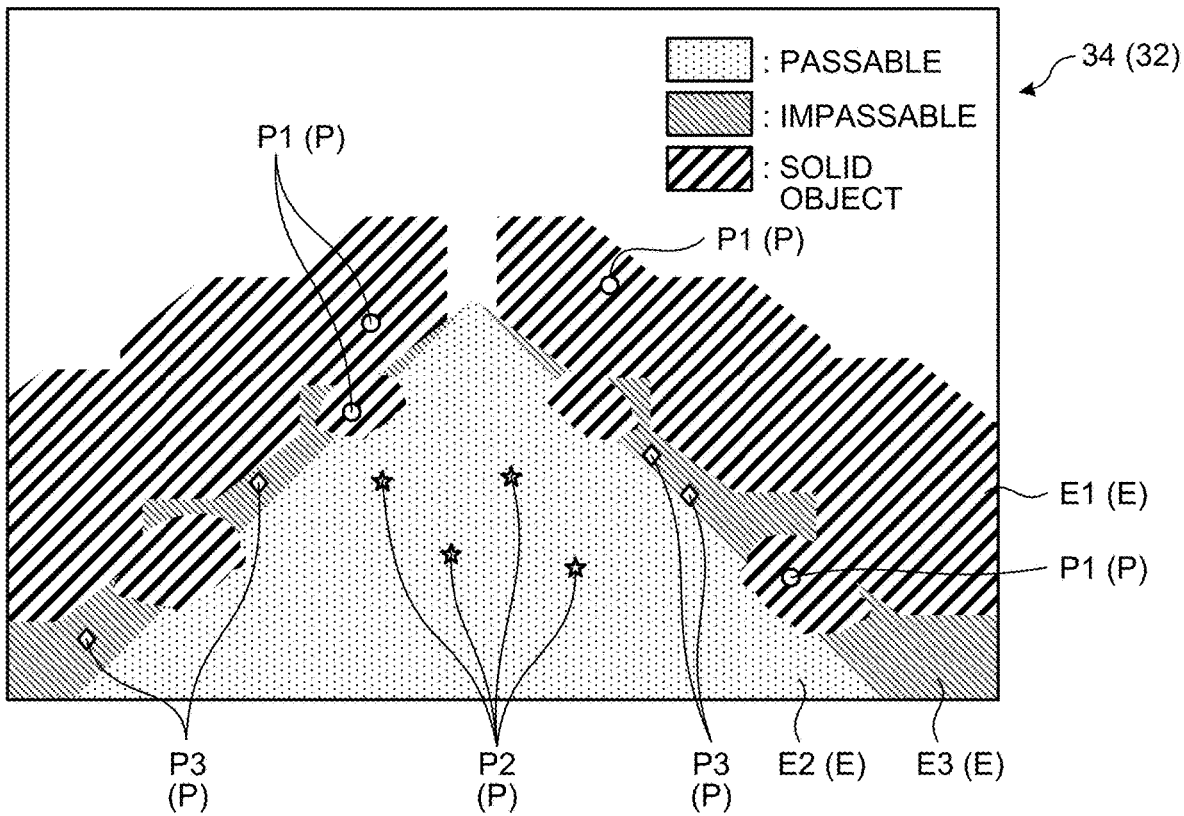
FIG. 5 is a schematic diagram of the attribute image.

FIG. 5 is an attribute image 34 in which the three-dimensional point P of the coordinates $(M=(X_C, Y_C, Z_C))$ after coordinate translation is placed, in the attribute image 32, at the pixel position indicated by the corresponding coordinates $(m=(x_C, y_C))$ calculated by the above-described Expression (2).

In FIG. 5, the three-dimensional point P placed in the region E1 to which the attribute indicating a solid object is assigned is indicated as a three-dimensional point P1 of a circle mark. That is, the attribute "solid object" is set to the three-dimensional point P1. Furthermore, in FIG. 5, the three-dimensional point P placed in the region E2 to which the attribute indicative of being passable is assigned is indicated as a three-dimensional point P2 of a star mark. That is, the attribute "passable" is set to the three-dimensional point P2. In FIG. 5, the three-dimensional point P placed in the region E3 to which the attribute indicative of being impassable is assigned is indicated as a three-dimensional point P3 of a rhombus mark. That is, the attribute "impassable" is set to the three-dimensional point P3.

The setter 20E then outputs to the generator 20F the three-dimensional point information on the three-dimensional points P (for example, the three-dimensional point P1 to the three-dimensional point P3) and the attributes set to the respective three-dimensional points P.

Referring back to FIG. 2, the description is continued. Next, the generator 20F will be described.

The generator 20F generates an obstacle map on the basis of the three-dimensional point information on the three-dimensional point P and the attribute set to the three-dimensional point P.

In the present embodiment, the generator 20F generates the obstacle map indicating, for each sectional region, the degree of being passable or impassable.

The sectional region indicates each region for which the space in the periphery of the photographing unit 10J (the mobile body 10) is divided into a plurality of sectional regions in a lattice form, along a polar coordinate system with the photographing unit 10J (the mobile body 10) as the origin. That is, in the present embodiment, the position of the photographing unit 10J and the mobile body 10 is used as a reference position.

The size of the sectional region is greater than or equal to the size of the three-dimensional point P measured by the measurer 10K. That is, the size of the sectional region may be the same as the size of the three-dimensional point P. Furthermore, the size of the sectional region may be the size capable of including a plurality of three-dimensional points P. That is, the size of the sectional region may be the same as the size corresponding to the sensor resolution that is the maximum density of the three-dimensional point that can be measured by the measurer 10K, or may be the size greater than the size corresponding to the sensor resolution. The maximum size that the sectional region can assume only needs to be adjusted as appropriate.

In the present embodiment, the case where the size of the sectional region is greater than or equal to the size of the three-dimensional point P will be described. Thus, in the present embodiment, the case where, in one sectional region, one or more three-dimensional points P are included will be described as one example.

The degree of being passable or impassable is represented by probability, for example. The degree of being passable or impassable is not limited to the form of representing by the probability. In the present embodiment, the form in which the generator 20F represents the degree of being passable or impassable by the probability will be described as one example.

Furthermore, in the present embodiment, the case where the generator 20F generates an obstacle map in which the impassableness probability is specified for each sectional region will be described as one example. The impassableness probability indicates the probability of being impossible for the mobile body 10 to travel. The impassableness probability means that the probability of being impassable is higher as the value is higher.

In more detail, the generator 20F first identifies the positional information on the photographing unit 10J at the photographed time of the captured image 30. The positional information only needs to be identified from the self-location information acquired at the photographed time of the relevant captured image 30. As in the foregoing, the positional information on the photographing unit 10J is represented by the world coordinates.

Then, the generator 20F divides the space of the periphery of the photographing unit 10J (the mobile body 10) into a plurality of sectional regions in a lattice form, along the polar coordinate system with the photographing unit 10J (the mobile body 10) as the origin.

Figure 6:
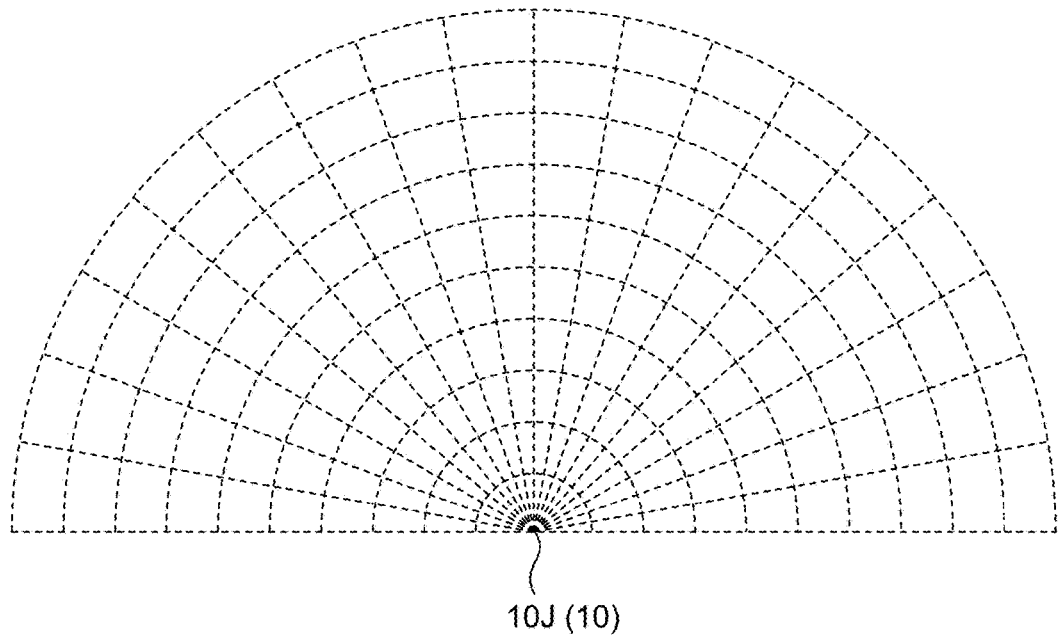
FIG. 6 is a diagram illustrating an orthogonal coordinate system.

FIG. 6 is a diagram illustrating in an orthogonal coordinate system the sectional regions for which the space in the periphery of the photographing unit 10J is divided, along the polar coordinate system with the photographing unit 10J as the origin. In FIG. 6, illustrated is an example in which the range of 180° of the front of the photographing unit 10J is divided into 18 angular directions by sectioning for each 10°.

Then, the generator 20F converts, on the three-dimensional point P to which the attribute has been set, the coordinates of the three-dimensional point P from the orthogonal coordinates $(x,z)$ into the polar coordinates $(r,\theta)$, by using the following Expression (3) and Expression (4).

$$r = \sqrt{x^2 + z^2} \tag{3}$$

$$\theta = a\tan(z/x) \tag{4}$$

Then, as illustrated in FIG. 6, the generator 20F calculates, for each angular direction of the polar coordinates with the photographing unit 10J as the origin, the impassableness probability corresponding to the attribute set to the three-dimensional point P.

In the present embodiment, the case where the generator 20F specifies, for each angular direction, the impassableness probability corresponding to the attribute set to the three-dimensional point P will be described as one example. In other words, in the present embodiment, the generator 20F generates the obstacle map by specifying, for each angular direction, the impassableness probability of each sectional region arrayed along the angular direction.

The impassableness probability corresponding to the attribute only needs to be defined in advance.

In the present embodiment, the generator 20F sets a first impassableness probability, as the impassableness probability, to the sectional region corresponding to the three-dimensional point P1 to which the attribute indicating a solid object has been set. In the present embodiment, as the first impassableness probability, "1.0" indicating the maximum impassableness probability is set. This is to indicate that the sectional region corresponding to the three-dimensional point P1 to which the attribute indicating a solid object has been set is impossible to travel due to the presence of an obstacle.

Furthermore, the generator 20F specifies a second impassableness probability, as the impassableness probability, to the sectional region corresponding to the three-dimensional point P2 to which the attribute indicative of being passable has been set. The second impassableness probability is a value lower than that of the first impassableness probability. In the present embodiment, the case where "0.0" indicating the least value is set as the second impassableness probability will be described. This is to indicate that the sectional region corresponding to the three-dimensional point P2 to which the attribute indicative of being passable has been set is possible to travel due to the absence of an obstacle.

The generator 20F further sets the first impassableness probability "1.0", as the impassableness probability, to the sectional region corresponding to the three-dimensional point P3 to which the attribute indicative of being impassable has been set. This is to indicate that the sectional region corresponding to the three-dimensional point P3 to which the attribute indicative of being impassable has been set has high probability of being impassable due to the regulations of the traffic rules and the like.

In addition, the generator 20F specifies an intermediate probability, as the impassableness probability, to the sectional region that is arranged farther away from the photographing unit 10J than, in the angular direction with the position of the photographing unit 10J as the origin, the sectional region arranged at the position closest to the photographing unit 10J and corresponding to the three-dimensional point P1 to which the attribute indicating a solid object has been set. The intermediate probability is an intermediate value between the first impassableness probability (1.0) and the second impassableness probability (0.0). In the present embodiment, the case where "0.5" is set as the intermediate probability will be described as one example. This is to indicate that the state of the relevant sectional region is unknown.

Then, the generator 20F specifies the impassableness probabilities, to the sectional regions to which no impassableness probability has been specified in the above-described processing, on the basis of the sectional regions to which the impassableness probabilities (the first impassableness probability, the second impassableness probability, and the intermediate probability) have been specified, by a method which will be described later. By the foregoing processing, the generator 20F generates the obstacle map.

The generation processing of the obstacle map will be described in detail. FIG. 7 is a diagram illustrating the photographing surroundings of the attribute image 34 illustrated in FIG. 5 as a top view corresponding to a bird's-eye view. As illustrated in FIG. 7, the generator 20F calculates, for each angular direction, the impassableness probability corresponding to the attribute set to the three-dimensional point P.

In FIG. 7, as one example, three angular directions (the angular direction A to the angular direction C) with the photographing unit 10J (the mobile body 10) as the origin are illustrated. In FIG. 7, it is assumed that, in the angular direction A, a building is present at the closest position as viewed from the photographing unit 10J and is located at the distance $r_0$ from the photographing unit 10J. Furthermore, it is assumed that, in the angular direction B, a vehicle is present at the closest position as viewed from the photographing unit 10J and is located at the distance $r_0$ from the photographing unit 10J. It is further assumed that, in the angular direction C, there are no solid objects such as vehicles and buildings present.

Then, the generator 20F specifies, for each angular direction, the impassableness probability corresponding to the attribute set to the three-dimensional point P.

Referring back to FIG. 2, the description is continued. In the present embodiment, the generator 20F includes the first generator 20H, the second generator 20I, and the integrator 20J.

First, the first generator 20H will be described. The first generator 20H generates a first obstacle map in which the impassableness probability is specified to the sectional region corresponding to the three-dimensional point P1 to which the attribute indicating a solid object has been set. In more detail, the first generator 20H generates a first obstacle map 40 by specifying, in the angular direction including the sectional region corresponding to the three-dimensional point P1 to which the attribute indicating a solid object has been set, the impassableness probability to each sectional region arrayed along the relevant angular direction.

First, the first generator 20H identifies, out of the angular directions, an angular direction including the sectional region corresponding to the three-dimensional point P1 to which the attribute indicating a solid object has been set. In the case of the example illustrated in FIG. 7, the first generator 20H identifies the angular direction A and the angular direction B.

Then, the first generator 20H specifies the first impassableness probability (1.0), as the impassableness probability, to the sectional regions corresponding to the three-dimensional point P1 to which the attribute indicating a solid object has been set.

Next, the first generator 20H specifies the second impassableness probability (0.0), as the impassableness probability, to other sectional regions within the range from the position of the photographing unit 10J (the mobile body 10) that is the reference position to the sectional region corresponding to the relevant three-dimensional point P1. This is because, in the sectional regions located closer to the photographing unit 10J than the solid object located at the closest position from the photographing unit 10J (the mobile body 10), the probability of being passable is high as the obstacle is not present.

Moreover, the first generator 20H specifies the intermediate probability (0.5), as the impassableness probability, to other sectional regions within the range farther away from the photographing unit 10J (the mobile body 10) that is the reference position than the sectional region corresponding to the three-dimensional point P1 to which the attribute indicating a solid object has been set. This is because, in the sectional regions located farther from the photographing unit 10J than the solid object located at the closest position from the photographing unit 10J (the mobile body 10), the state is unknown due to the shielding by the solid object.

Figure 8A:
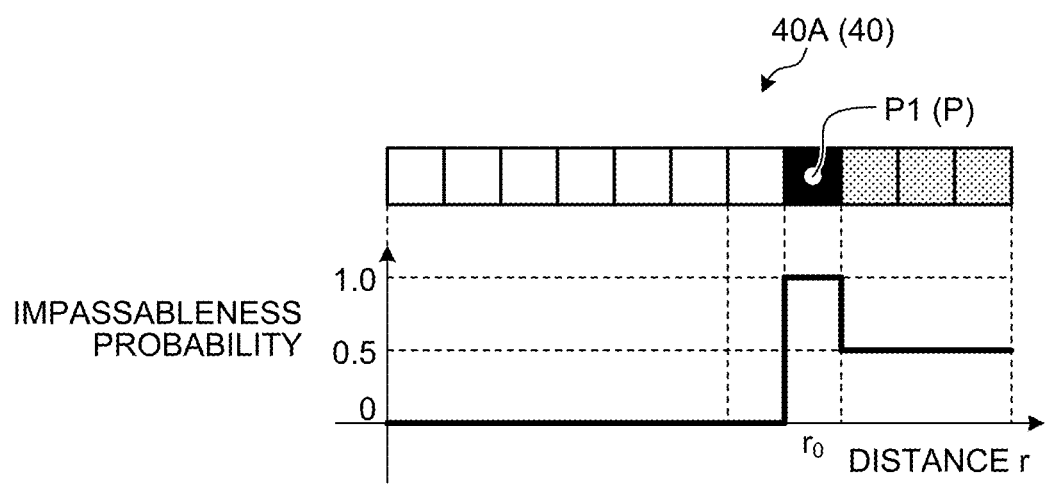
FIGS. 8A and 8B are schematic diagrams illustrating impassableness probabilities.
Figure 8B:
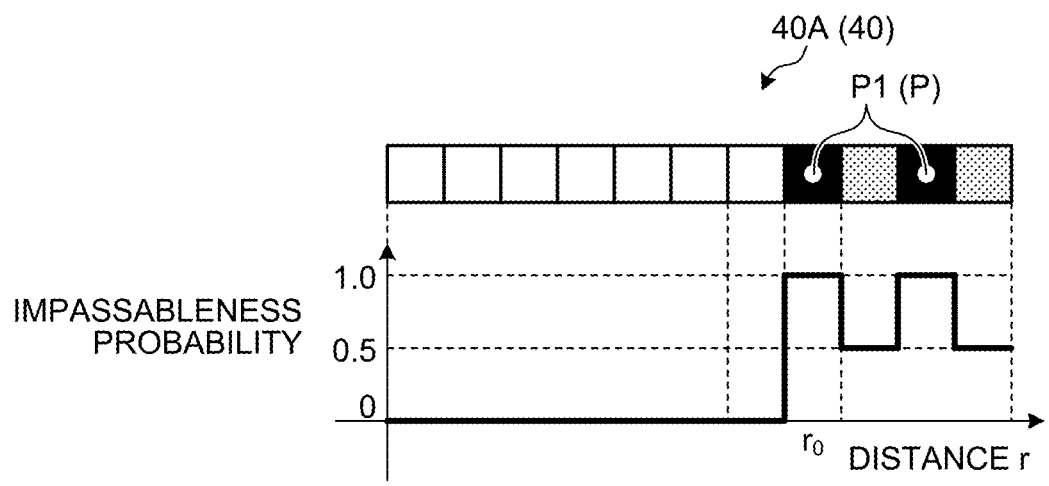

FIGS. 8A and 8B are schematic diagrams illustrating the impassableness probabilities that the first generator 20H specified. FIG. 8A is a schematic diagram illustrating by extracting a plurality of sectional regions arrayed along the angular direction A and the angular direction B in FIG. 7. In other words, FIG. 8A is a schematic diagram illustrating, in the first obstacle map 40, the impassableness probability specified to each of a plurality of sectional regions 40A arrayed along a specific angular direction.

As illustrated in FIG. 8A, the first generator 20H specifies the first impassableness probability "1.0" to the sectional region corresponding to the three-dimensional point P1 located at the distance $r_0$ from the photographing unit 10J and to which the attribute indicating a solid object has been set. Furthermore, the first generator 20H specifies the second impassableness probability "0.0" to the sectional regions that are present in the range between the sectional region located at the distance $r_0$ and the photographing unit 10J (the mobile body 10). The first generator 20H further specifies the intermediate probability "0.5" to the sectional regions that are present in the range farther from the photographing unit 10J (the mobile body 10) than the sectional region located at the distance $r_0$.

As just described, the first generator 20H generates the first obstacle map 40 by specifying, for each angular direction, out of the respective angular directions, including the sectional region corresponding to the three-dimensional point P1 to which the attribute indicating a solid object has been set, the impassableness probability to each sectional region arrayed along the relevant angular direction.

There may be the case where another solid object is present at the position farther away from the photographing unit 10J than a solid object that is present at the closest position (the position of the distance $r_0$) as viewed from the photographing unit 10J. In this case, as illustrated in FIG. 8B, the first generator 20H only needs to further specify, after specifying the impassableness probabilities in the same manner as that with FIG. 8A, the first impassableness probability "1.0" to the sectional region arranged at the position farther from the photographing unit 10J than the sectional region at the position of the distance $r_0$ and corresponding to the three-dimensional point P1 to which the attribute indicating a solid object has been set.

There may be an angular direction that does not include the three-dimensional point P1 to which the attribute indicating a solid object has been set. For example, the angular direction C illustrated in FIG. 7 does not include the three-dimensional point P1 to which the attribute indicating a solid object has been set. In this case, the first generator 20H specifies "0.5" that is the intermediate probability, to the sectional regions arrayed along the relevant angular direction C.

FIG. 9 is a schematic diagram illustrating the impassableness probabilities that the first generator 20H specified. In more detail, FIG. 9 is a schematic diagram illustrating the impassableness probability specified to each of a plurality of sectional regions 40C arrayed along the angular direction C in FIG. 7. As illustrated in FIG. 9, the first generator 20H specifies the intermediate probability "0.5" to the sectional regions arrayed along the angular direction C that does not include the three-dimensional point P1.

In this way, the first generator 20H generates the first obstacle map 40 in which the impassableness probabilities are specified in the above-described manner on the angular direction including the sectional region corresponding to the three-dimensional point P1 to which the attribute indicating a solid object has been set.

Next, the second generator 20I will be described. The second generator 20I generates a second obstacle map in which the impassableness probabilities are specified to the sectional regions corresponding to the three-dimensional points P (the three-dimensional point P2 and the three-dimensional point P3) to which the attribute indicative of being passable or impassable has been set.

In more detail, the second generator 20I generates the second obstacle map by specifying, in the angular direction including the sectional regions corresponding to the three-dimensional points P (the three-dimensional point P2 and the three-dimensional point P3) to which the attribute indicative of being passable or impassable has been set, the impassableness probability to each sectional region arrayed along the relevant angular direction.

The second generator 20I specifies the first impassableness probability "1.0", out of the sectional regions arrayed along each angular direction, to the sectional region corresponding to the three-dimensional point P3 to which the attribute indicative of being impassable has been set. Furthermore, the second generator 20I specifies the second impassableness probability "0.0", out of the sectional regions arrayed along each angular direction, to the sectional region corresponding to the three-dimensional point P2 to which the attribute indicative of being passable has been set.

Then, the second generator 20I sets, out of the sectional regions arrayed along the identified angular direction, the intermediate probability "0.5" to the sectional regions to which neither the attribute indicative of being passable nor the attribute indicative of being impassable has been specified.

Figure 10A:
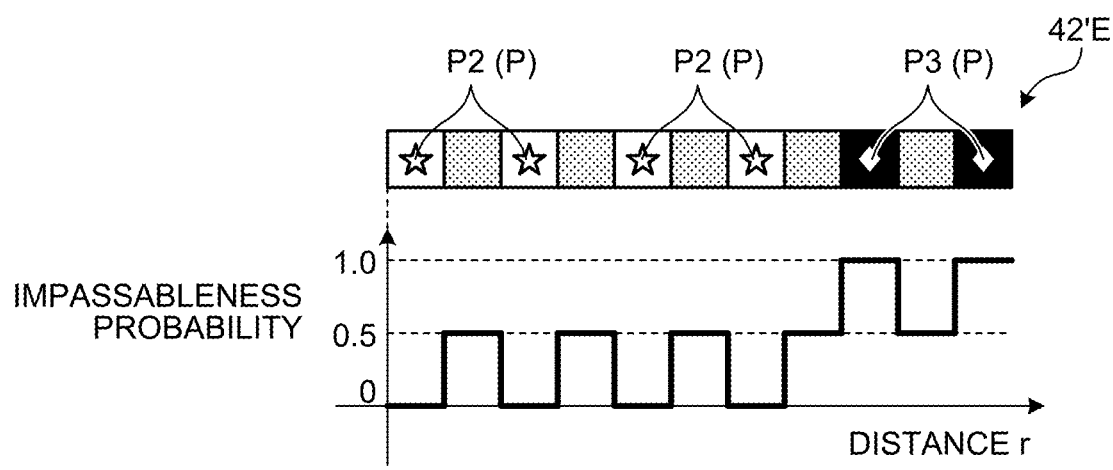
FIGS. 10A and 10B are schematic diagrams illustrating the impassableness probabilities.
Figure 10B:
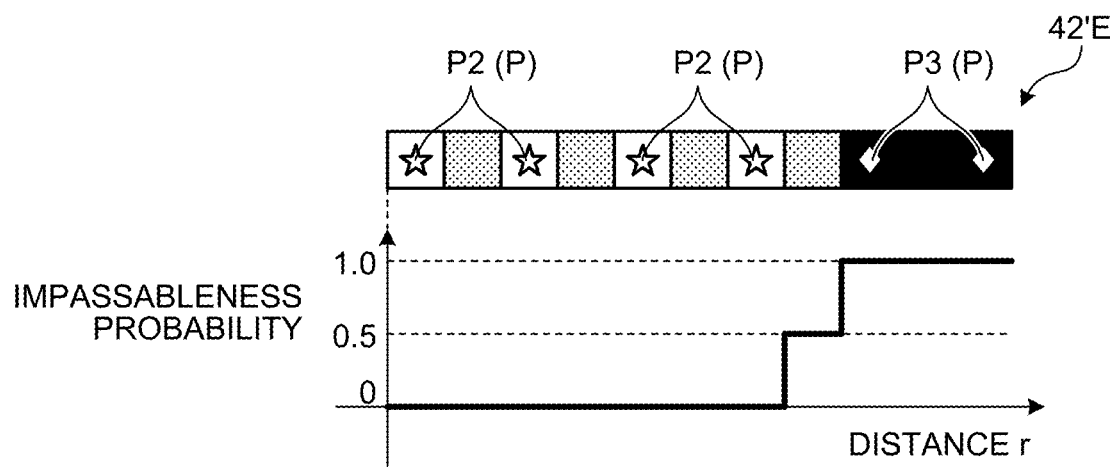

FIGS. 10A and 10B are schematic diagrams illustrating the impassableness probabilities that the second generator 20I specified. FIG. 10A is a schematic diagram illustrating, in a second obstacle map 42', the impassableness probability specified to each of a plurality of sectional regions 42'E arrayed along a specific angular direction.

As illustrated in FIG. 10A, the second generator 20I specifies the first impassableness probability "1.0", out of the sectional regions along the relevant angular direction, to the sectional region corresponding to the three-dimensional point P3 to which the attribute indicative of being impassable has been set. Furthermore, the second generator 20I specifies the second impassableness probability "0.0", out of the sectional regions along the relevant angular direction, to the sectional region corresponding to the three-dimensional point P2 to which the attribute indicative of being passable has been set. In addition, the second generator 20I specifies the intermediate probability "0.5", out of the sectional regions along the relevant angular direction, to the sectional regions to which no attribute indicative of being passable or impassable has been specified.

Then, the second generator 20I specifies the impassableness probabilities based on the sectional regions to which the first impassableness probability "1.0" or the second impassableness probability "0.0" has been specified, to the sectional regions to which the intermediate probability "0.5" has been specified. That is, the second generator 20I complements the impassableness probabilities of the sectional regions to which the intermediate probability "0.5" has been specified, by using the impassableness probabilities of the peripheral sectional regions to which the first impassableness probability or the second impassableness probability has been specified.

Specifically, the second generator 20I complements the impassableness probabilities of the sectional regions to which the intermediate probability "0.5" has been specified in FIG. 10A, by using the impassableness probabilities of the peripheral sectional regions to which the second impassableness probability "0.0" or the first impassableness probability "1.0" has been specified.

FIG. 10B is a schematic diagram illustrating the state in which the sectional regions to which the intermediate probability "0.5" has been specified in FIG. 10A are complemented (changed) by using the impassableness probabilities that have been specified to the other peripheral sectional regions.

As illustrated in FIG. 10A, the second generator 20I changes the impassableness probability of the sectional regions to which the intermediate probability "0.5" has been specified to the impassableness probability specified to a pair of other sectional regions adjacent in the angular direction.

Specifically, it is assumed that the sectional region to which the intermediate probability "0.5" has been specified is sandwiched, along the angular direction, by a pair of sectional regions to which the second impassableness probability "0.0" has been specified. In this case, the second generator 20I changes the impassableness probability of the relevant sectional region, to which the intermediate probability "0.5" has been specified, to the second impassableness probability "0.0" (see FIG. 10B).

Furthermore, it is assumed that the sectional region to which the intermediate probability "0.5" has been specified is sandwiched, along the angular direction, by a pair of sectional regions to which the first impassableness probability "1.0" has been specified. In this case, the second generator 20I changes the impassableness probability of the relevant sectional region, to which the intermediate probability "0.5" has been specified, to the first impassableness probability "1.0" (see FIG. 10B).

It is further assumed that the sectional region to which the intermediate probability "0.5" has been specified is sandwiched, along the angular direction, by the sectional region to which the first impassableness probability "1.0" has been specified and the sectional region to which the second impassableness probability "0.0" has been specified. In this case, the second generator 20I specifies the impassableness probability of the relevant sectional region, to which the intermediate probability "0.5" has been specified, to the intermediate probability "0.5" that is an intermediate value between the first impassableness probability and the second impassableness probability (see FIG. 10B).

In this way, the second generator 20I generates the second obstacle map 42 by specifying, in the angular direction including the sectional regions corresponding to the three-dimensional points P (the three-dimensional point P2 and the three-dimensional point P3) to which the attribute indicative of being passable or impassable has been set, the impassableness probability to each sectional region arrayed along the relevant angular direction.

Figure 11A:
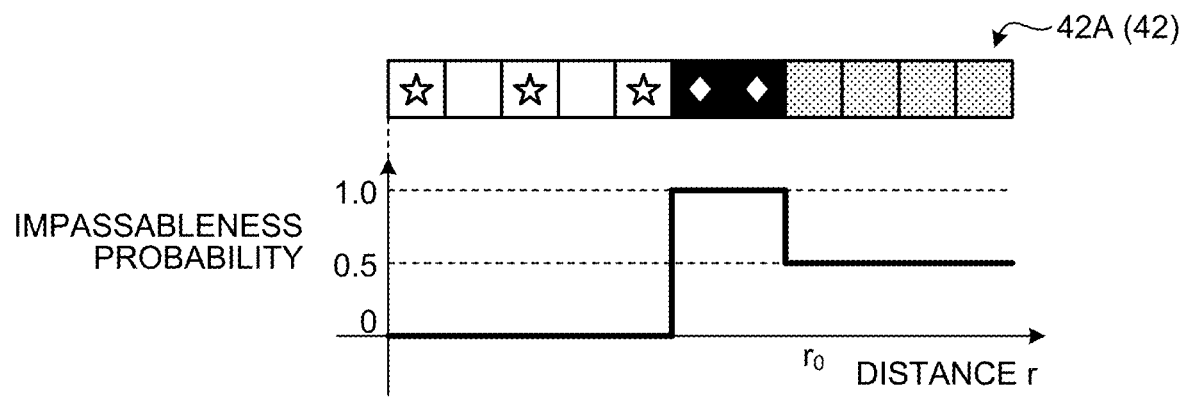
FIGS. 11A, 11B, and 11C are schematic diagrams illustrating the impassableness probabilities.
Figure 11B:
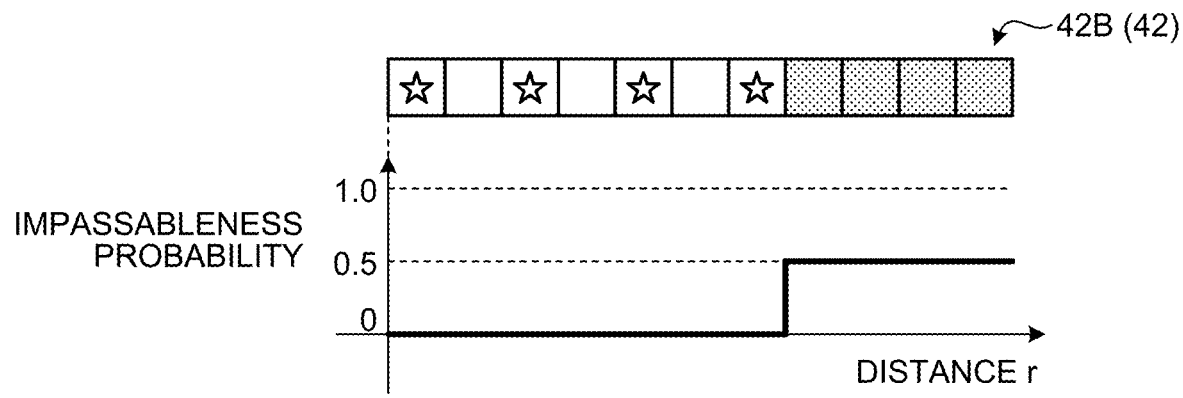
Figure 11C:
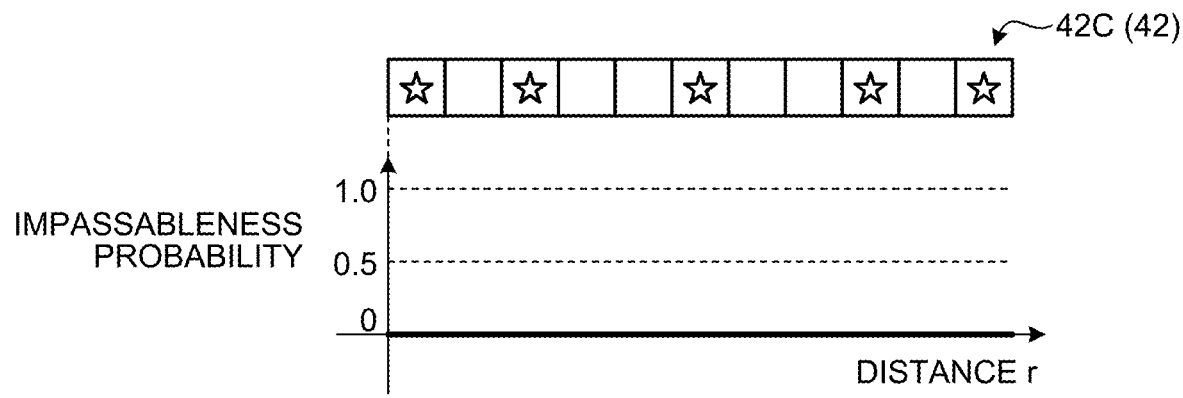

Thus, in the second obstacle map 42, the impassableness probability specified to each of the sectional regions corresponding to the respective angular direction A to the angular direction C illustrated in FIG. 7 becomes the diagrams illustrated in FIGS. 11A to 11C. FIGS. 11A to 11C are schematic diagrams illustrating the impassableness probabilities that the second generator 20I specified. FIG. 11A is a schematic diagram illustrating the impassableness probability specified to each of the sectional regions 42A arrayed along the angular direction A illustrated in FIG. 7. FIG. 11B is a schematic diagram illustrating the impassableness probability specified to each of the sectional regions 42B arrayed along the angular direction B illustrated in FIG. 7. FIG. 11C is a schematic diagram illustrating the impassableness probability specified to each of the sectional regions 42C arrayed along the angular direction C illustrated in FIG. 7.

The second generator 20I may, when complementing the sectional region to which the intermediate probability "0.5" has been specified by using the impassableness probabilities specified to the other peripheral sectional regions, consider the attribute assigned to the region E (see FIG. 4) corresponding to the sectional region to which the intermediate probability "0.5" has been specified.

This will be described specifically by using FIG. 10A. In FIG. 10A, assumed is the case of complementing the impassableness probability of the sectional region that is located at the second from the leftmost side and to which the intermediate probability "0.5" has been specified. In this case, as in the foregoing, the second generator 20I performs complement processing by using the second impassableness probability "0.0" specified to each of the sectional regions corresponding to the three-dimensional points P2 that are located at the leftmost side and at the third from the left in FIG. 10A and to which the attribute indicative of being passable has been set.

It is assumed that the three-dimensional point P2 corresponding to the sectional region located at the leftmost side in FIG. 10A corresponds to a pixel of the pixel position (x1,y1) in the attribute image 32 (see FIG. 4). Furthermore, it is assumed that, in FIG. 10A, the three-dimensional point P2 corresponding to the sectional region located at the third from the leftmost side corresponds to a pixel of the pixel position (x2,y2) in the attribute image 32 (see FIG. 4). It is further assumed that, in the attribute image 32, the range connecting the pixel position (x1,y1) and the pixel position (x2,y2) is within the range of the sectional regions of complement target.

Then, assumed is the case where, in the attribute image 32, no attribute indicative of being impassable is assigned to the pixels (region E) located in the range connecting the pixel position (x1,y1) and the pixel position (x2,y2). In this case, as illustrated in FIG. 10B, the second generator 20I sets the second impassableness probability "0.0" corresponding to the attribute indicative of being passable to the sectional regions of complement target.

Meanwhile, assumed is the case where, in the attribute image 32, the attribute indicative of being impassable is assigned to the pixels (region E) located in the range connecting the pixel position (x1,y1) and the pixel position (x2,y2). In this case, the second generator 20I sets the intermediate probability "0.5" to the sectional regions of complement target.

There may be the case where a plurality of three-dimensional points P to which the attributes different from each other have been assigned correspond to one sectional region. For example, there may be the case where there is a sectional region corresponding to both the three-dimensional point P2 to which the attribute indicative of being passable has been set and the three-dimensional point P3 to which the attribute indicative of being impassable has been set.

In this case, the second generator 20I only needs to specify, to the relevant section region, the first impassableness probability "1.0" that is the impassable probability corresponding to the attribute indicative of being impassable.

Next, the integrator 20J will be described. The integrator 20J generates an obstacle map in which the first obstacle map 40 and the second obstacle map 42 are integrated.

In more detail, the integrator 20J integrates the first obstacle map 40 and the second obstacle map 42 on the basis of priority of the impassableness probability.

The priority of the impassableness probability only needs to be set in advance. In the present embodiment, the integrator 20J sets in advance the priority for which the first impassableness probability "1.0" is the highest, the second impassableness probability "0.0" is the second highest, and the intermediate probability "0.5" is the lowest.

Then, the integrator 20J specifies the impassableness probability of higher priority to each sectional region included in the obstacle map, out of the impassableness probability specified to the sectional region corresponding to the first obstacle map 40 and the impassableness probability specified to the sectional region corresponding to the second obstacle map 42. By this processing, the integrator 20J generates the obstacle map in which the first obstacle map 40 and the second obstacle map 42 are integrated.

Figure 12A:
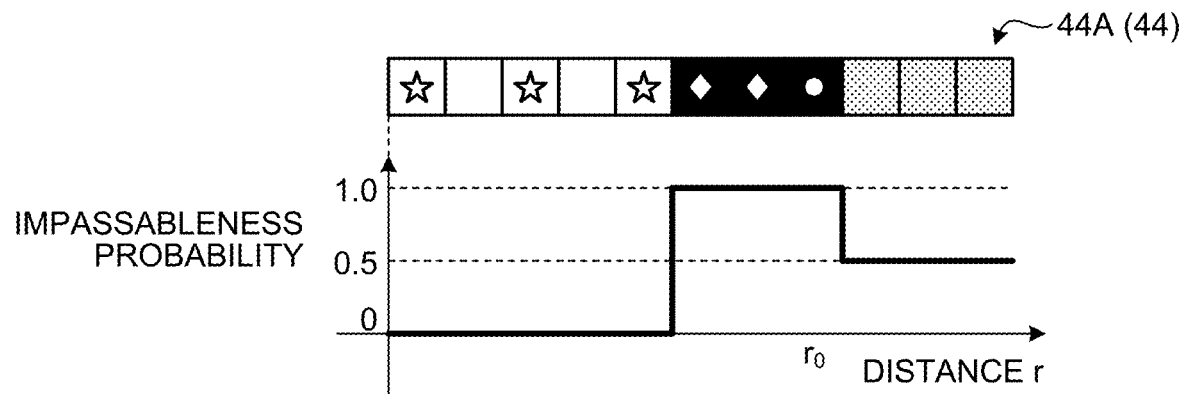
FIGS. 12A, 12B, and 12C are schematic diagrams illustrating the impassableness probabilities.
Figure 12B:
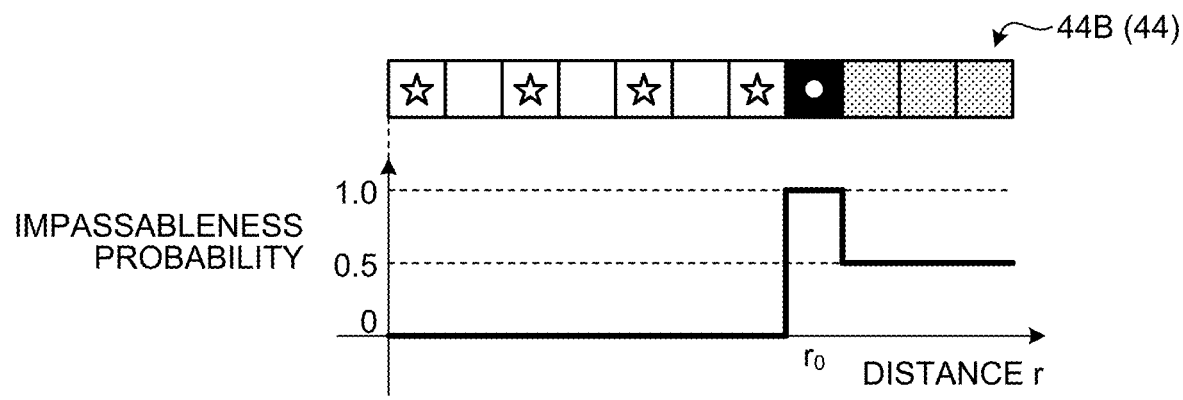
Figure 12C:
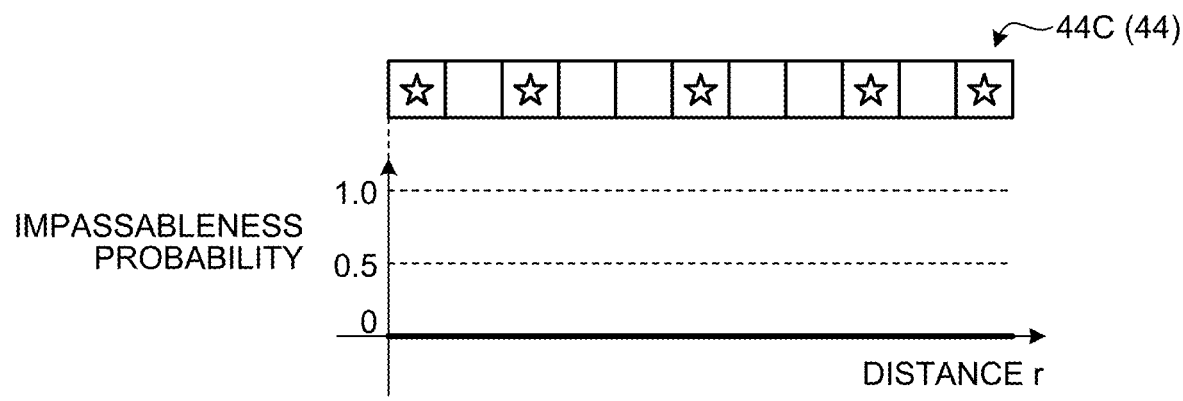

This will be described specifically by using FIGS. 12A to 12C. FIGS. 12A to 12C are schematic diagrams illustrating, in an obstacle map 44, the impassableness probability specified to each of the sectional regions (sectional region 44A to sectional region 44C) arrayed along the respective angular directions (angular direction A to angular direction C).

FIG. 12A is a schematic diagram illustrating, in the obstacle map 44, the impassableness probabilities specified to the sectional regions 44A arrayed along the angular direction A. The integrator 20J integrates the impassableness probabilities (see FIG. 8A) specified to the sectional regions 40A arrayed along the angular direction A in the first obstacle map 40 and the impassableness probabilities (see FIG. 11A) specified to the sectional regions 42A arrayed along the angular direction A in the second obstacle map 42. By this integration, the integrator 20J specifies the impassableness probabilities illustrated in FIG. 12A on the sectional regions 44A arrayed along the angular direction A.

FIG. 12B is a schematic diagram illustrating, in the obstacle map 44, the impassableness probabilities specified to the sectional regions 44B arrayed along the angular direction B. The integrator 20J integrates the impassableness probabilities (see FIG. 8A) specified to the sectional regions 40A arrayed along the angular direction B in the first obstacle map 40 and the impassableness probabilities (see FIG. 11B) specified to the sectional regions 42B arrayed along the angular direction B in the second obstacle map 42. By this integration, the integrator 20J specifies the impassableness probabilities illustrated in FIG. 12B on the sectional regions 44B arrayed along the angular direction B.

FIG. 12C is a schematic diagram illustrating, in the obstacle map 44, the impassableness probabilities specified to the sectional regions 44C arrayed along the angular direction C. The integrator 20J integrates the impassableness probabilities (see FIG. 9) specified to the sectional regions 40C arrayed along the angular direction C in the first obstacle map 40 and the impassableness probabilities (see FIG. 11C) specified to the sectional regions 42C arrayed along the angular direction C in the second obstacle map 42. By this integration, the integrator 20J specifies the impassableness probabilities illustrated in FIG. 12C on the sectional regions 44C arrayed along the angular direction C.

By the above-described processing, the integrator 20J generates the obstacle map 44 for which the first obstacle map 40 and the second obstacle map 42 are integrated.

Figure 13:
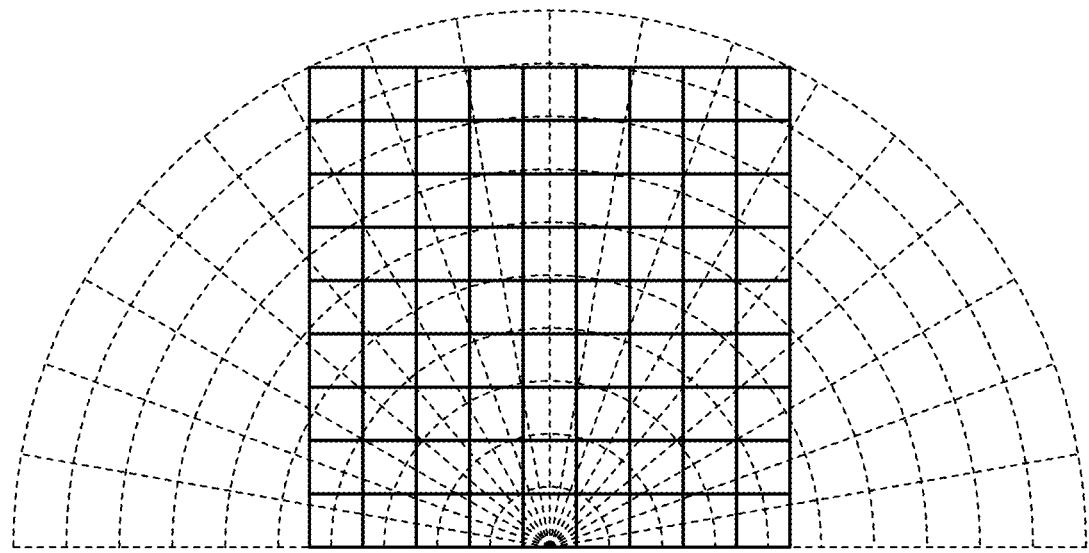
FIG. 13 is a diagram illustrating an orthogonal coordinate system.

Then, the integrator 20J converts the obstacle map 44 generated in the polar coordinate system into an orthogonal coordinate system. FIG. 13 is a diagram illustrating in the orthogonal coordinate system the relation between the sectional regions in the polar coordinate system and the sectional regions in the orthogonal coordinate system. In FIG. 13, the sectional regions sectioned by solid lines are the sectional regions divided in a rectangular shape in the orthogonal coordinate system. In FIG. 13, the sectional regions sectioned by broken lines are the sectional regions that are divided in a rectangular shape in the polar coordinate system and displayed in the orthogonal coordinate system.

The integrator 20J identifies, on each sectional region represented in the orthogonal coordinate system, the sectional region of the nearest position out of the sectional regions represented in the polar coordinate system, by using the nearest neighbor method. Then, the integrator 20J specifies, to the respective sectional regions represented in the orthogonal coordinate system, the impassableness probability identified to each sectional region and specified to the closest sectional region in the polar coordinate system.

Furthermore, the integrator 20J identifies, on each sectional region represented in the orthogonal coordinate system, the sectional region located in the closest vicinity out of a plurality of sectional regions represented in the polar coordinate system. The integrator 20J then complements the impassableness probability of the identified sectional region by using the bilinear method. Then, the integrator 20J may specify, to the sectional region of a specifying target represented in the orthogonal coordinate system, the impassableness probability obtained by the relevant complement.

The foregoing methods are one example of coordinate transformation from the polar coordinate system into the orthogonal coordinate system, and the embodiment is not limited to these methods.

By the above-described processing, the integrator 20J, that is, the generator 20F generates the obstacle map 44 corresponding to the bird's-eye view.

Figure 14:
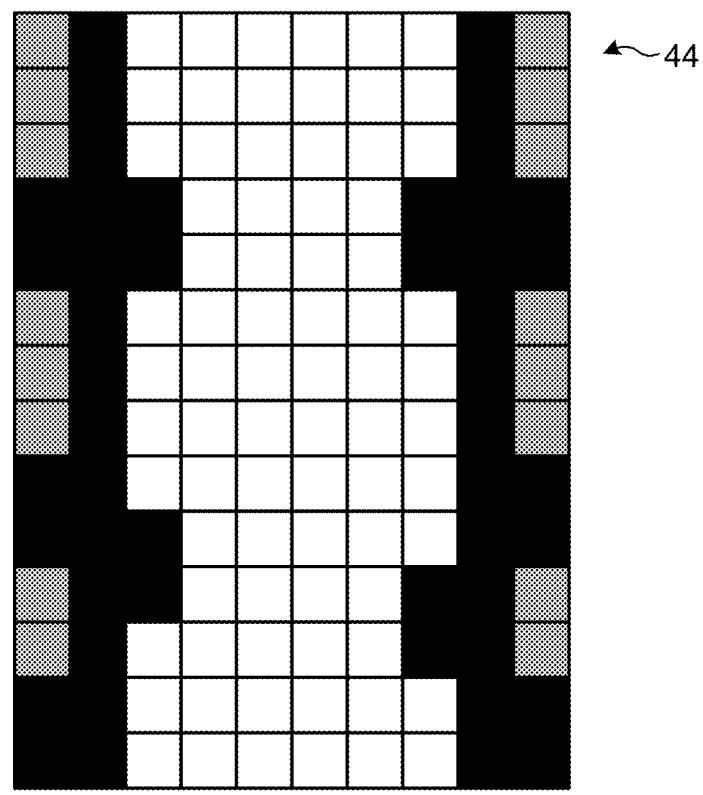
FIG. 14 is a schematic diagram of an obstacle map.

FIG. 14 is a diagram illustrating one example of the obstacle map 44. By the above-described processing, the generator 20F generates the obstacle map 44. In FIG. 14, the sectional regions represented in white are the sectional regions to which the second impassableness probability "0.0" has been assigned. In FIG. 14, the sectional regions represented in black are the sectional regions to which the first impassableness probability "1.0" has been assigned. In FIG. 14, the sectional regions represented in gray are the sectional regions to which the intermediate probability "0.5" has been assigned.

The generator 20F may time-serially integrate the generated obstacle map 44 with the obstacle map 44 that has been generated in the past.

Figure 15:
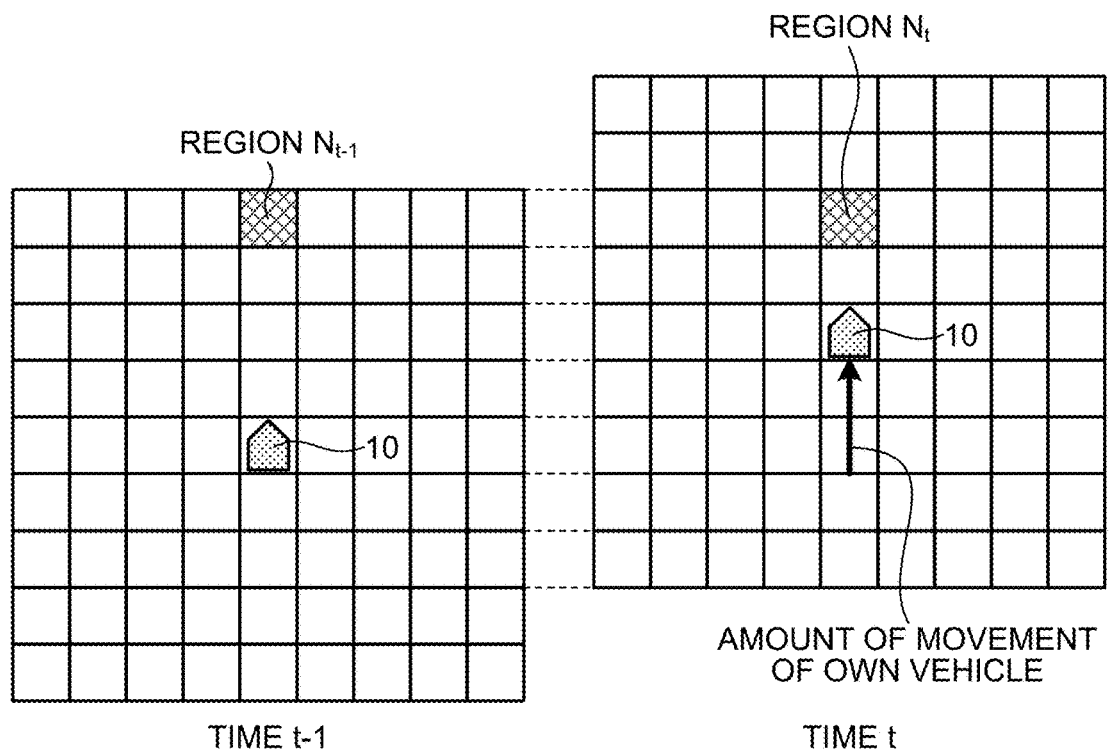
FIG. 15 is an explanatory diagram of time-series integration.

FIG. 15 is an explanatory diagram of time-series integration. FIG. 15 illustrates a plurality of sectional regions obtained by dividing the space of the periphery centering the mobile body 10 at each of time t−1 and time t.

The region $N_{t-1}$ that is the sectional region at the time t−1 and the region $N_t$ that is the sectional region at the time t differ in the relative position from the mobile body 10 at the respective time. However, these region $N_{t-1}$ and region $N_t$ indicate the same position in the world coordinate space.

Thus, the generator 20F calculates, from the self-location information, the amount of movement of the mobile body 10 between the time t and the time t−1 that is the time immediately before that. Then, the generator 20F obtains, based on the amount of movement of the mobile body 10, the sectional regions at the time t−1 that correspond to the respective sectional regions at the time t. In the example in FIG. 15, the region $N_{t-1}$ is obtained as the sectional region at the time t−1 that corresponds to the region $N_t$ at the time t. The generator 20F then integrates the impassableness probability specified to the region $N_t$ and the impassableness probability specified to the region $N_{t-1}$ in the past. In this integration, it only needs to use Bayes' theorem expressed in the following Expression (5), for example.

$$\frac{p(m_i|z_1 \ldots z_t)}{1 - p(m_i|z_1 \ldots z_t)} = \frac{p(m_i|z_t)}{1 - p(m_i|z_t)} \cdot \frac{p(m_i|z_1 \ldots z_{t-1})}{1 - p(m_i|z_1 \ldots z_{t-1})} \quad (5)$$

In Expression (5), $P(m_i|z_t)$ represents the impassableness probability that is based on the current positional information, $p(m_i|z_i, \ldots, z_{t-1})$ represents the impassableness probability that is based on the past positional information, and $p(m_i|z_1, \ldots, z_t)$ represents the impassableness probability that is based on the positional information up until the present.

The generator 20F generates the obstacle map 44 for which the impassableness probabilities specified to the respective sectional regions are integrated in time series, and thus it is possible to robustly calculate the impassableness probabilities even when the sensor observed a value including noise at any timing, for example.

Referring back to FIG. 2, the description is continued. The generator 20F outputs the generated obstacle map 44 to the output controller 20G.

The output controller 20G outputs the information indicating the obstacle map 44. In the present embodiment, the output controller 20G outputs the information indicating the obstacle map 44 to at least one of the output unit 10A and the power controller 10G.

The output controller 20G displays the information indicating the obstacle map 44 on the display 10E. In the present embodiment, the output controller 20G displays a display screen including the obstacle map 44 on the display 10E.

Figure 16:
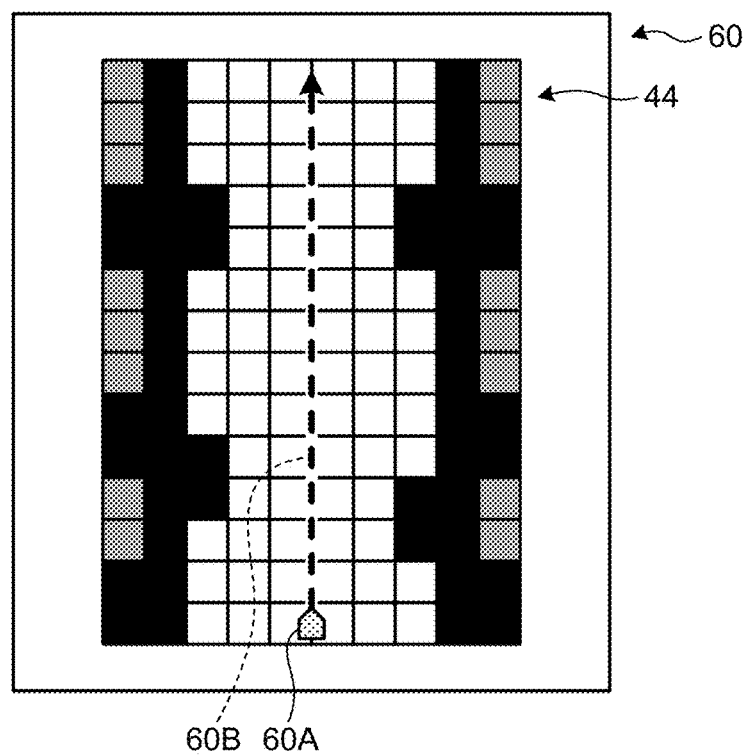
FIG. 16 is a schematic diagram of a display screen.

FIG. 16 is a schematic diagram illustrating one example of a display screen 60. The display screen 60 includes the obstacle map 44 generated in the generator 20F. Because of this, the user can, by checking the display screen 60, easily recognize the impassableness probabilities. The display screen 60 may be a screen for which, on the obstacle map 44, an image 60A indicating the mobile body 10 that is the own vehicle and a line 60B indicating a planned travel route or a recommended route of the mobile body 10 are superimposed.

Referring back to FIG. 2, the description is continued. The output controller 20G may further control the display 10E and the speaker 10F so as to output the sound and the light indicating the obstacle map 44. Furthermore, the output controller 20G may transmit the information indicating the obstacle map 44 to an external device via the communicator 10D.

The output controller 20G may output the information indicating the obstacle map 44 to the power controller 10G. That is, the output controller 20G may output to the power controller 10G the information indicating the impassableness probability specified to each sectional region included in the obstacle map 44.

In this case, the power controller 10G controls the power unit 10H in accordance with the information indicating the obstacle map 44 received from the output controller 20G. For example, the power controller 10G may, in accordance with the impassableness probability specified to each sectional region included in the obstacle map 44, generate a power control signal for controlling the power unit 10H and control the power unit 10H. The power control signal, in the power unit 10H, is a control signal for controlling a drive unit that performs the drive concerning the travel of the mobile body 10. For example, the power controller 10G controls the steering, the engine, or the like of the mobile body 10 so that the mobile body 10 travels the regions of the real space corresponding to the sectional regions to which the second impassableness probability "0.0" has been specified in the obstacle map 44.

Figure 17:
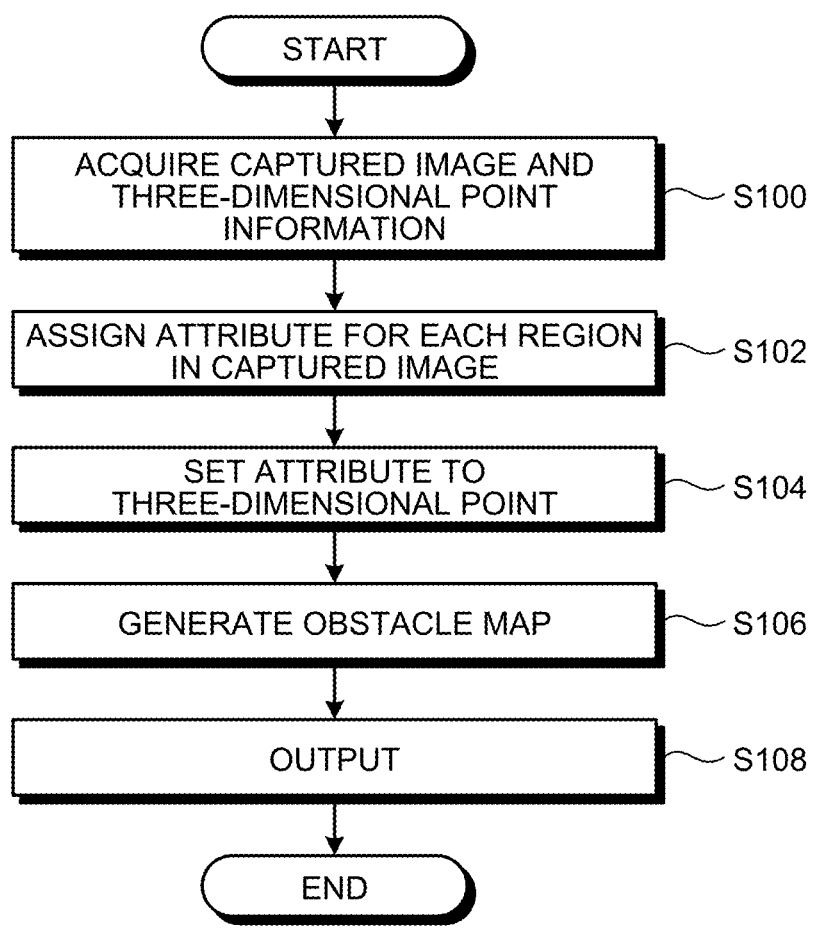
FIG. 17 is a flowchart of information processing.

Next, one example of a procedure of information processing that the information processing apparatus 20 performs will be described. FIG. 17 is a flowchart illustrating one example of the procedure of information processing.

First, the acquirer 20C acquires the captured image 30, and the three-dimensional point information on the three-dimensional points P of the photographed surroundings of the captured image 30 (Step S100).

Then, the assignor 20D assigns the attribute to each region E in the captured image 30 acquired at Step S100 (Step S102).

The setter 20E then sets, to the three-dimensional points P indicated by the three-dimensional point information acquired at Step S100, the attributes assigned to the corresponding regions E in the captured image 30 (Step S104).

Then, the generator 20F generates the obstacle map 44 on the basis of the three-dimensional point information on the three-dimensional points P acquired at Step S100 and the attributes set to the three-dimensional points P at Step S104 (Step S106).

The output controller 20G then outputs the information indicating the obstacle map 44 generated at Step S106 to the output unit 10A and the power controller 10G (Step S108). Then, the present routine is ended.

As in the foregoing, the information processing apparatus 20 of the present embodiment includes the acquirer 20C, the assignor 20D, the setter 20E, and the generator 20F. The acquirer 20C acquires the captured image 30 (an image) and the three-dimensional point information on the three-dimensional points P of the acquired surroundings of the captured image 30. The assignor 20D assigns the attribute to each region E in the captured image 30. The setter 20E sets, to the three-dimensional points P, the attribute assigned to the corresponding region E in the captured image 30. The generator 20F generates the obstacle map 44 on the basis of the three-dimensional point information and the attributes set to the three-dimensional points P.

As in the foregoing, the information processing apparatus 20 of the present embodiment sets the attribute of the three-dimensional point P on the basis of the attribute of the corresponding region E on the captured image 30, and generates the obstacle map 44 on the basis of the attribute set to the three-dimensional point P.

Because of this, the information processing apparatus 20 of the present embodiment is able to generate the obstacle map 44 while suppressing the amount of calculations and the amount of memory used.

Consequently, the information processing apparatus 20 of the present embodiment is able to achieve reducing a processing load.

Modifications

In the above-described embodiment, the form in which the outside sensor 10B is provided externally to the information processing apparatus 20 has been described as one example (see FIG. 2). The information processing apparatus 20 may, however, be in a configuration that includes the outside sensor 10B.

Figure 18:
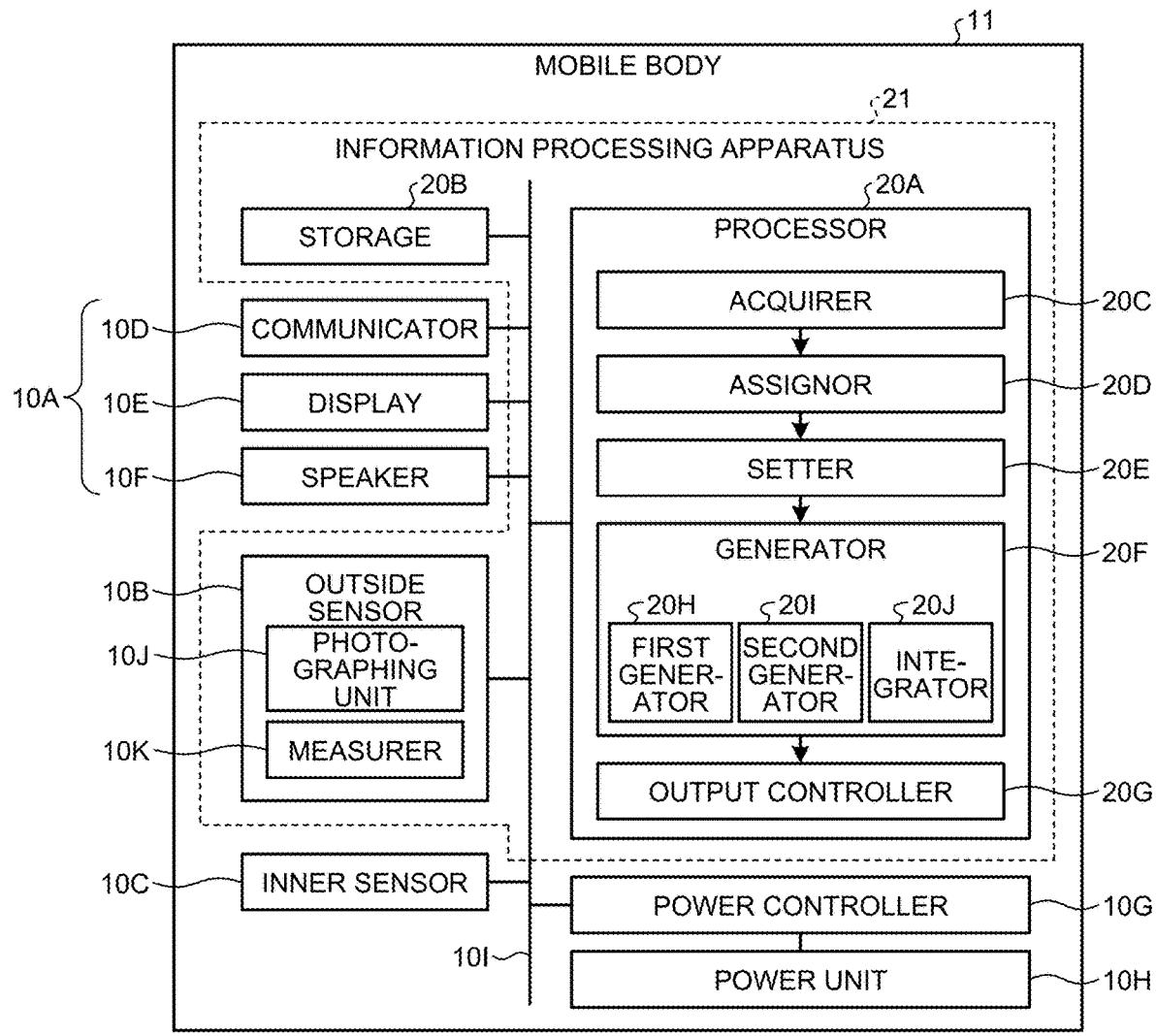
FIG. 18 is a diagram illustrating a configuration of a mobile body.

FIG. 18 is a schematic diagram illustrating one example of the configuration of a mobile body 11 of a modification. The constituent elements having the same functions as those described in the above-described embodiment are denoted by the same reference signs and the detailed explanations thereof are omitted.

In the mobile body 11, the output unit 10A, the inner sensor 10C, the power controller 10G, the power unit 10H, and an information processing apparatus 21 are connected via the bus 10I. The mobile body 11 is the same as the mobile body 10 of the above-described embodiment except for the point that the information processing apparatus 21 is included in lieu of the information processing apparatus 20.

The information processing apparatus 21 includes the storage 20B, the processor 20A, and the outside sensor 10B. The information processing apparatus 21 is the same as the information processing apparatus 20 of the above-described embodiment except for the point that the outside sensor 10B is further included. The outside sensor 10B is the same as that of the above-described embodiment.

As illustrated in FIG. 18, the information processing apparatus 21 may be in a configuration that further includes, in addition to the processor 20A and the storage 20B, the outside sensor 10B (that is, the photographing unit 10J and the measurer 10K).

The information processing apparatus 21 may be in a configuration that further includes, in addition to the processor 20A and the storage 20B, at least one of the communicator 10D, the display 10E, the speaker 10F, the inner sensor 10C, and the power controller 10G.

Hardware Configuration

Figure 19:
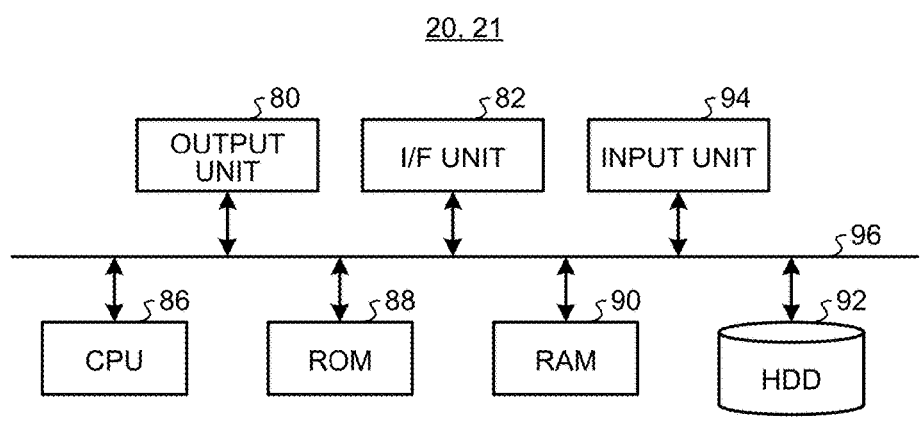
FIG. 19 is a hardware configuration diagram.

Next, one example of a hardware configuration of the information processing apparatus 20 of the above-described embodiment and the information processing apparatus 21 of the modification will be described. FIG. 19 is one example of a hardware configuration diagram of the information processing apparatus 20 and the information processing apparatus 21.

The information processing apparatus 20 and the information processing apparatus 21 include a control device such as a CPU 86; a storage device such as a read only memory (ROM) 88, a random access memory (RAM) 90, and a hard disk drive (HDD) 92; an I/F unit 82 that is an interface with various devices; an output unit 80 that outputs various information such as output information; an input unit 94 that receives operations by the user; and a bus 96 that connects various units, and are in a hardware configuration using an ordinary computer.

In the information processing apparatus 20 and the information processing apparatus 21, the CPU 86 reads out and executes a program from the ROM 88 onto the RAM 90, thereby implementing the above-described various units on the computer.

The program for executing each of the above-described processing executed in the information processing apparatus 20 and the information processing apparatus 21 may be stored in the HDD 92. Furthermore, the program for executing each of the above-described processing executed in the information processing apparatus 20 and the information processing apparatus 21 may be incorporated and provided in the ROM 88 in advance.

The program for executing the above-described processing executed in the information processing apparatus 20 and the information processing apparatus 21 may be stored in a computer-readable storage medium such as a CD-ROM, a CD-R, a memory card, a digital versatile disc (DVD), a flexible disk (FD), or the like in a file of an installable or executable format and provided as a computer program product. The program for executing the above-described processing executed in the information processing apparatus 20 and the information processing apparatus 21 may be stored in a computer connected to a network such as the Internet and be available for download via the network. The program for executing the above-described processing executed in the information processing apparatus 20 and the information processing apparatus 21 may also be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
one or more processors configured to:
    acquire an image and three-dimensional point information on a three-dimensional point of acquired surroundings of the image;
    assign an attribute to each region in the image;
    set, to the three-dimensional point, the attribute assigned to the corresponding region in the image; and
    generate an obstacle map based on the three-dimensional point information and an impassableness probability corresponding to the attribute set to the three-dimensional point, the obstacle map indicating a degree of being passable or impassable for each sectional region, wherein the one or more processors are further configured to
    generate a first obstacle map in which the impassableness probability is specified to the sectional region corresponding to the three-dimensional point to which the attribute indicating a solid object has been set, the first obstacle map specifying the impassableness probability,
    generate a second obstacle map in which the impassableness probability is specified to the sectional region corresponding to the three-dimensional point to which the attribute indicative of being passable or impassable has been set, and
    generate the obstacle map in which the first obstacle map and the second obstacle map are integrated.

2. The apparatus according to claim 1, wherein the one or more processors are further configured to generate the obstacle map corresponding to a bird's-eye view.

3. The apparatus according to claim 1, wherein the attribute assigned by the one or more processors indicates being passable, being impassable, or a solid object.

4. The apparatus according to claim 1, wherein, in the first obstacle map generated by the one or more processors,
a first impassableness probability, as the impassableness probability, is specified to the sectional region corresponding to the three-dimensional point to which the attribute indicating a solid object has been set,
a second impassableness probability that is lower than the first impassableness probability, as the impassableness probability, is specified to another sectional region being in a range from a reference position to the sectional region to which the first impassableness probability has been specified, and an intermediate probability between the first impassableness probability and the second impassableness probability, as the impassableness probability, is specified to another sectional region being in a range farther away from the reference position than the sectional region to which the first impassableness probability has been specified.

5. The apparatus according to claim 4, wherein, in the second obstacle map generated by the one or more processors,
the first impassableness probability is specified to the sectional region corresponding to the three-dimensional point to which the attribute indicative of being impassable has been set,
the second impassableness probability is specified to the sectional region corresponding to the three-dimensional point to which the attribute indicative of being passable has been set, and
the impassableness probability based on the sectional region to which the first impassableness probability or the second impassableness probability has been specified is specified to the sectional region to which neither the first impassableness probability nor the second impassableness probability is specified.

6. The apparatus according to claim 5, wherein the one or more processors specify the impassableness probability, which corresponds to the attribute indicative of being impassable, to the sectional region corresponding to both the three-dimensional point to which the attribute indicative of being passable has been set and the three-dimensional point to which the attribute indicative of being impassable has been set.

7. The apparatus according to claim 5, wherein the one or more processors generate the obstacle map, in which the first obstacle map and the second obstacle map are integrated, based on priority of the impassableness probability indicating that the first impassableness probability is highest, the second impassableness probability is second highest, and the intermediate probability is lowest, by specifying the impassableness probability of higher priority to each sectional region included in the obstacle map out of the impassableness probability specified to the sectional region corresponding to the first obstacle map and the impassableness probability specified to the sectional region corresponding to the second obstacle map.

8. The apparatus according to claim 1, wherein the one or more processors display, on a display, a display screen including the obstacle map.

9. The apparatus according to claim 1, further comprising a sensor configured to photograph the image and measure the three-dimensional point information on the three-dimensional point of the acquired surroundings at time of photographing the image,
wherein the one or more processors are configured to acquire the image and the three-dimensional point information from the sensor.

10. The apparatus according to claim 9, wherein the one or more processors are further configured to measure the three-dimensional point information by using a laser.

11. The apparatus according to claim 10, wherein the one or more processors are further configured to measure the three-dimensional point information based on an irradiation direction of the laser and information on reflected light of the laser at the three-dimensional point.

12. The apparatus according to claim 1, wherein the one or more processors include a processor configured to control a power unit of a mobile body based on information indicating the obstacle map.

13. A computer program product including a non-transitory computer-readable medium in which programmed instructions are stored, the programmed instructions causing, when executed by a computer, the computer to perform a method comprising:
acquiring an image and three-dimensional point information on a three-dimensional point of acquired surroundings of the image;
assigning an attribute to each region in the image;
setting, to the three-dimensional point, the attribute assigned to the corresponding region in the image; and
generating an obstacle map based on the three-dimensional point information and an impassableness probability corresponding to the attribute set to the three-dimensional point, the obstacle map indicating a degree of being passable or impassable for each sectional region, wherein the method further comprises
generating a first obstacle map in which the impassableness probability is specified to the sectional region corresponding to the three-dimensional point to which the attribute indicating a solid object has been set, the first obstacle map specifying the impassableness probability,
generating a second obstacle map in which the impassableness probability is specified to the sectional region corresponding to the three-dimensional point to which the attribute indicative of being passable or impassable has been set, and
generating the obstacle map in which the first obstacle map and the second obstacle map are integrated.

14. An information processing method, comprising:
acquiring an image and three-dimensional point information on a three-dimensional point of acquired surroundings of the image;
assigning an attribute to each region in the image;
setting, to the three-dimensional point, the attribute assigned to the corresponding region in the image; and
generating an obstacle map based on the three-dimensional point information and an impassableness probability corresponding to the attribute set to the three-dimensional point, the obstacle map indicating a degree of being passable or impassable for each sectional region, wherein the method further comprises
generating a first obstacle map in which the impassableness probability is specified to the sectional region corresponding to the three-dimensional point to which the attribute indicating a solid object has been set, the first obstacle map specifying the impassableness probability,
generating a second obstacle map in which the impassableness probability is specified to the sectional region corresponding to the three-dimensional point to which the attribute indicative of being passable or impassable has been set, and
generating the obstacle map in which the first obstacle map and the second obstacle map are integrated.

* * * * *